United States Patent
Nemoto et al.

(10) Patent No.: US 8,661,215 B2
(45) Date of Patent: Feb. 25, 2014

(54) SYSTEM AND METHOD OF ACQUIRING AND COPYING SNAPSHOTS

(75) Inventors: Jun Nemoto, Kawasaki (JP); Atsushi Sutoh, Yokohama (JP); Takaki Nakamura, Ebina (JP); Yoji Nakatani, Yokohama (JP)

(73) Assignee: Hitachi Ltd., Tokyo (JP)

( * ) Notice: Subject to any disclaimer, the term of this patent is extended or adjusted under 35 U.S.C. 154(b) by 2 days.

(21) Appl. No.: 13/587,049

(22) Filed: Aug. 16, 2012

(65) Prior Publication Data

US 2012/0311284 A1      Dec. 6, 2012

Related U.S. Application Data

(63) Continuation of application No. 12/212,049, filed on Sep. 17, 2008, now Pat. No. 8,271,753.

(30) Foreign Application Priority Data

Jul. 23, 2008    (JP) ................................. 2008-190119

(51) Int. Cl.
    *G06F 12/00*    (2006.01)
(52) U.S. Cl.
    USPC ........... 711/162; 711/161; 711/111; 711/112; 707/609; 707/640
(58) Field of Classification Search
    USPC ........... 711/162, 161, 111, 112; 707/609, 640
    See application file for complete search history.

(56) References Cited

U.S. PATENT DOCUMENTS

| | | | |
|---|---|---|---|
| 7,127,578 B2 | 10/2006 | Nagata | |
| 2003/0158869 A1 | 8/2003 | Micka | |
| 2004/0168034 A1* | 8/2004 | Homma et al. | 711/162 |
| 2005/0188256 A1 | 8/2005 | Stager et al. | |
| 2006/0174075 A1 | 8/2006 | Sutoh | |
| 2006/0277376 A1 | 12/2006 | Watanabe et al. | |
| 2007/0073783 A1 | 3/2007 | Honami et al. | |
| 2007/0168404 A1 | 7/2007 | Nakamura et al. | |
| 2007/0168629 A1* | 7/2007 | Mogi et al. | 711/162 |
| 2007/0294495 A1 | 12/2007 | Uchida et al. | |
| 2008/0034176 A1* | 2/2008 | Akutsu et al. | 711/162 |
| 2008/0215836 A1 | 9/2008 | Sutoh et al. | |
| 2008/0282049 A1 | 11/2008 | Kawamura et al. | |
| 2010/0023716 A1 | 1/2010 | Nemoto et al. | |

OTHER PUBLICATIONS

AJ Lewis, "LVM HOWTO" pp. 1-71, Nov. 27, 2006.

* cited by examiner

*Primary Examiner* — Hong Kim
(74) *Attorney, Agent, or Firm* — Brundidge & Stanger, P.C.

(57) ABSTRACT

Difference information between two snapshots from a first point-in-time snapshot, which has been copied, to an $N^{th}$ point-in-time snapshot, which constitutes the latest point-in-time snapshot, is acquired to a memory module. The memory module stores two or more pieces of difference information. The two or more pieces of difference information comprise difference information that shows the difference between a first point-in-time snapshot and any snapshot other than the first point-in-time snapshot of N snapshots. Copy difference information, which is information that shows the difference between the first point-in-time snapshot and a specified snapshot from among N snapshots, and which is used in copying the specified snapshot, is created on the basis of the two or more pieces of difference information.

10 Claims, 15 Drawing Sheets

CREATION OF ARBITRARY INTER-GENERATIONAL DIFFERENCE BITMAP

FIG. 4

400 COW MANAGEMENT TABLE

| OPERATIONAL VOLUME BLOCK ADDRESS | SNAPSHOT 1 | SNAPSHOT 2 | SNAPSHOT 3 | ... | SNAPSHOT n |
|---|---|---|---|---|---|
| | 1 | 2 | 3 | ... | - |
| 0 | 32 | 0 | 0 | ... | - |
| 1 | 0 | 0 | 0 | ... | - |
| 2 | 69 | 201 | 423 | ... | - |
| 3 | 108 | 108 | 0 | ... | - |
| ⋮ | ⋮ | ⋮ | ⋮ | ⋮ | ⋮ |
| p-1 | 0 | 0 | 0 | ... | - |

FIG. 5

| DIFFERENTIAL VOLUME BLOCK ADDRESS | USAGE STATUS FLAG |
|---|---|
| 0 | 1 |
| 1 | 1 |
| 2 | 0 |
| ⋮ | ⋮ |
| q-1 | 0 |

BLOCK USAGE BITMAP (500)

FIG. 6

| OPERATIONAL VOLUME BLOCK ADDRESS | COW STATUS FLAG |
|---|---|
| 0 | 1 |
| 1 | 0 |
| 2 | 1 |
| 3 | 0 |
| ⋮ | ⋮ |
| p-1 | 0 |

COW BITMAP

DIFFERENCE BITMAP MANAGEMENT TABLE

| | 701 | 702 | 703 | 704 | 70n |
|---|---|---|---|---|---|
| 710 — OPERATIONAL VOLUME BLOCK ADDRESS | SNAPSHOT 1 | SNAPSHOT 2 | SNAPSHOT 3 | ⋯ | SNAPSHOT n |
| | 1 | 2 | 3 | | - |
| 711 — 0 | - | 1 | 0 | ⋯ | - |
| 712 — 1 | - | 0 | 0 | ⋯ | - |
| 713 — 2 | - | 1 | 1 | ⋯ | - |
| 714 — 3 | - | 0 | 1 | ⋯ | - |
| 715 — ⋮ | ⋮ | ⋮ | ⋮ | ⋮ | ⋮ |
| p-1 | - | 0 | 0 | ⋯ | - |

CREATION OF ARBITRARY INTER-GENERATIONAL DIFFERENCE BITMAP

| OPERATIONAL VOLUME BLOCK ADDRESS | SNAPSHOT 1-2 DIFFERENCE BITMAP | SNAPSHOT 2-3 DIFFERENCE BITMAP | SNAPSHOT 1-3 DIFFERENCE BITMAP |
|---|---|---|---|
| 0 | 1 | 0 | 1 |
| 1 | 0 | 0 | 0 |
| 2 | 1 | 1 | 1 |
| 3 | 0 | 1 | 1 |
| ⋮ | ⋮ | ⋮ | ⋮ |
| p−1 | 0 | 0 | 0 |

801 — OPERATIONAL VOLUME BLOCK ADDRESS
802 — SNAPSHOT 1-2 DIFFERENCE BITMAP
803 — SNAPSHOT 2-3 DIFFERENCE BITMAP
804 — SNAPSHOT 1-3 DIFFERENCE BITMAP 811, 812, 813, 814, 815

OR →

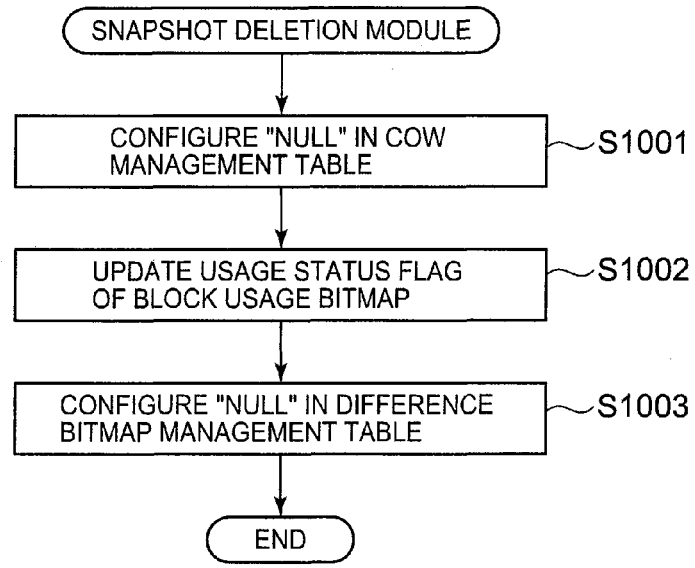
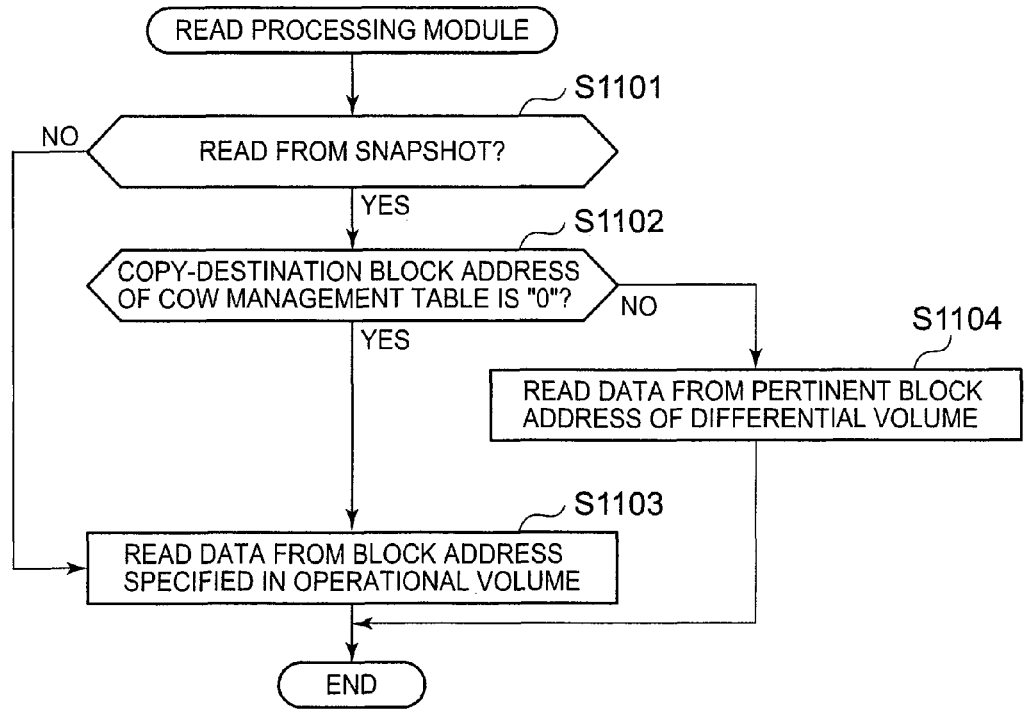

| OPERATIONAL VOLUME BLOCK ADDRESS | DIFFERENCE YES/NO FLAG |
|---|---|
| 0 | 1 |
| 1 | 0 |
| 2 | 1 |
| 3 | 1 |
| ⋮ | ⋮ |
| p-1 | 0 |

MERGED DIFFERENCE BITMAP

| OPERATIONAL VOLUME BLOCK ADDRESS | SNAPSHOT 1 | | SNAPSHOT 2 | | SNAPSHOT 3 | | SNAPSHOT 4 | | ... | SNAPSHOT n | |
|---|---|---|---|---|---|---|---|---|---|---|---|
| | 25 | 25 | 26 | 26 | 27 | 27 | 28 | 28 | ... | x | y |
| 0 | 0 | | 1 | | 0 | | 0 | | ... | 0 | |
| 1 | 0 | | 0 | | 0 | | 1 | | ... | 0 | |
| 2 | 0 | | 0 | | 0 | | 0 | | ... | 0 | |
| 3 | 1 | | 0 | | 1 | | 0 | | ... | 0 | |
| ⋮ | ⋮ | | ⋮ | | ⋮ | | ⋮ | | ⋮ | ⋮ | |
| p-1 | 1 | | 0 | | 1 | | 0 | | ... | 0 | |

MERGED DIFFERENCE BITMAP MANAGEMENT TABLE

2003'

| OPERATIONAL VOLUME BLOCK ADDRESS | SNAPSHOT 1 | | SNAPSHOT 2 | | SNAPSHOT 3 | | SNAPSHOT 4 | | ... | SNAPSHOT n | |
|---|---|---|---|---|---|---|---|---|---|---|---|
| | - | - | 25 | 26 | - | - | 27 | 28 | | x | y |
| 0 | - | | 1 | | - | | 0 | | ... | 0 | |
| 1 | - | | 0 | | - | | 1 | | ... | 0 | |
| 2 | - | | 0 | | - | | 0 | | ... | 0 | |
| 3 | - | | 1 | | - | | 1 | | ... | 0 | |
| ⋮ | ⋮ | | ⋮ | | ⋮ | | ⋮ | | ⋮ | ⋮ | |
| p−1 | - | | 1 | | - | | 1 | | ... | 0 | |

COPY-TARGETED SNAPSHOT SELECTION SCREEN

PLEASE SELECT SNAPSHOT TO BE COPIED TO SECONDARY SITE

2201   2202   2203

| | UNCOPIED SNAPSHOT | CREATION DATE/TIME |
|---|---|---|
| | Snapshot25 | 2065/04/03 09:00 |
| ✓ | Snapshot26 | 2065/04/03 13:00 |
| | Snapshot27 | 2065/04/03 17:00 |
| ✓ | Snapshot28 | 2065/04/03 21:00 |

2204   2205

[ SELECT ]   [ CANCEL ]

SYSTEM AND METHOD OF ACQUIRING AND COPYING SNAPSHOTS

CROSS-REFERENCE TO RELATED APPLICATION

The present application is a continuation of application Ser. No. 12/212,049, filed Sep. 17, 2008, now U.S. Pat. No. 8,271,753; which relates to and claims the benefit of priority from Japanese Patent Application number 2008-190119, filed on Jul. 23, 2008, the entire disclosure of which is incorporated herein by reference.

BACKGROUND OF THE INVENTION

The present invention generally relates to snapshot acquisition and copying.

The snapshot function and remote copy function, for example, are known as data protection functions.

The snapshot function is for creating and maintaining a snapshot, which is an image of an operational volume (a logical volume capable of being accessed from a higher-level device (for example, a server apparatus) of a storage apparatus) at a certain point in time. As a method for realizing the creation and maintenance of a snapshot, for example, there is a method that utilizes a logical volume function of a server apparatus. For example, the Logical Volume Manager (LVM) of the Linux Kernel (Linux is a registered trademark) can be cited as a logical volume function (refer to "LVM HOWTO" by A. J. Lewis (http://ibiblio.org/pub/Linux/docs/HOWTO/other-formats/pdf/LVM-HOWTO.pdf)-. When the LVM creates a snapshot of an operational volume, another logical volume is prepared as a logical volume for storing difference data (hereinafter, "differential volume"). When an update (write) occurs in the operational volume subsequent to the point in time at which the snapshot was created, the LVM copies the pre-update data inside the operational volume to the differential volume. This process is called Copy On Write (COW). The LVM has a function for managing a snapshot configured from the data inside the operational volume and the data inside the differential volume. This function is realizable by maintaining snapshot management information that shows if the respective data configuring the snapshot resides in the operational volume or the differential volume.

Meanwhile, the remote copy function is for executing a remote copy, which is a data copy from the storage apparatus of a primary site to the storage apparatus of a secondary site.

A method for carrying out a remote copy in snapshot units is known (for example, U.S. Pat. No. 7,127,578 and US Patent Published Application No. 2003/0158869). In U.S. Pat. No. 7,127,578 and US Patent Published Application No. 2003/0158869, a difference bitmap, which shows the difference between a remote-copy snapshot and a remote copy-targeted snapshot, is created, and data is transferred on the basis of this difference bitmap.

The respective bits that configure the inter-snapshot difference bitmap correspond to either one or a plurality of blocks of the operational volume, and show whether or not there is a difference in this either one or plurality of blocks. In U.S. Pat. No. 7,127,578 and US Patent Published Application No. 2003/0158869, a difference bitmap for transfer is created based on the inter-snapshot difference bitmap, and a remote copy is carried out based on this transfer difference bitmap.

In U.S. Pat. No. 7,127,578, when data inside an operational volume is copied to the secondary site while the latest generation snapshot is being copied to the secondary site, the transfer difference bitmap is created by merging a first difference bitmap created beforehand using the snapshot management information, and a second difference bitmap that show the location that changed in the operational volume subsequent to the latest snapshot being created.

According to U.S. Pat. No. 7,127,578, the first difference bitmap is created using the snapshot management information. Thus, it takes time to obtain the first difference bitmap, and since the transfer difference bitmap is created on the basis of the first difference bitmap, creating the transfer difference bitmap also takes time. In particular, when the snapshot management information is in a physical storage device of a storage apparatus (for example, in a hard disk drive (HDD) or other such disk-type storage device), time is also needed to read out the snapshot management information, thereby requiring even more time to create the transfer difference bitmap.

In Patent Published Application No. 2003/0158869, the difference between a base snapshot (a snapshot that has been copied to the secondary site) and an uncopied snapshot is managed by a bitmap (hereinafter, called the "COW bitmap") at all times, and the duplicate of this bitmap is used as the transfer difference bitmap. For this reason, unlike the invention of U.S. Pat. No. 7,127,578, snapshot management information is not needed to create the transfer difference bitmap.

However, the COW bitmap is information that is initialized every time a snapshot is created. Thus, once creating the latest generation snapshot, it is not possible to rapidly create a difference bitmap that is used in the remote copy of a snapshot of a generation between the latest generation snapshot and the base snapshot. That is, to create a difference bitmap like this requires the use of the snapshot management information as disclosed in U.S. Pat. No. 7,127,578. Therefore, it takes time to create the transfer difference bitmap for use in the remote copy of a generation snapshot between the latest generation snapshot and the base snapshot.

Similarly, the above-mentioned problems are also possible, for example, even when information of a format that differs from a bitmap is used to carry out a remote copy. Further, the above-mentioned problems are not limited to a remote copy, and are similarly possible even when a copy (for example, a backup) is carried out inside a single apparatus.

SUMMARY OF THE INVENTION

Therefore, an object of the present invention is to rapidly create difference information for use in copying a copy-targeted snapshot of an arbitrary generation.

The storage controller acquires, to a memory module, difference information that shows the difference between two snapshots of N (N is an integer of 3 or higher) snapshots from a first point-in-time snapshot, which has been copied, to an N.sup.th point-in-time snapshot, which constitutes the latest point-in-time snapshot. The storage unit stores two or more pieces of difference information. The two or more pieces of difference information comprise difference information that shows the difference between a first point-in-time snapshot and any of N snapshots other than the first point-in-time snapshot. On the basis of these two or more pieces of difference information, the storage controller creates copy difference information, which is information that shows the difference between the first point-in-time snapshot and a specified snapshot from among the N snapshots, and which is used to copy the above-mentioned specified snapshot.

Specifically, the storage controller comprises a logical volume; a memory module (for example, either a volatile or nonvolatile memory); a snapshot acquisition module that acquires a snapshot of the above-mentioned logical volume; a copy control module that copies a specified snapshot other than the above-mentioned first point-in-time snapshot from among N (N is an integer of three or higher) snapshots from the first point-in-time snapshot, which has been copied, to the N.sup.th point-in-time snapshot, which constitutes the latest point-in-time snapshot; a difference information acquisition module that acquires to the above-mentioned memory module difference information that shows the difference between two snapshots of the above-mentioned N snapshots; and a copy difference information creation module that creates copy difference information, which is information that shows the difference between the above-mentioned first point-in-time snapshot and the above-mentioned specified snapshot based on the above-mentioned two or more pieces of difference information stored in the above-mentioned memory module. The above-mentioned copy control module uses the above-mentioned copy difference information to carry out the copying of the above-mentioned specified snapshot.

More specifically, for example, a COW bitmap and a difference bitmap, which is a duplicate of the COW bitmap, can be used as the above-mentioned two or more pieces of difference information. Every time a snapshot is created, a plurality of difference bitmaps is stored in the memory module by storing the duplicate of a pre-reset COW bitmap (that is, the difference bitmap) to the memory module (for example, a memory). The respective bitmaps show the difference between a snapshot and the snapshot immediately previous thereto. Then, at the time of a copy (for example, a remote copy), a transfer difference bitmap is created by finding the bitwise-OR of two or more difference bitmaps relating to one or more snapshots between the first point-in-time snapshot and the specified snapshot.

As a preferred example, each time a snapshot is created, the COW bitmap of that point in time is merged with one difference bitmap (that is, the bitwise-OR is calculated). In this case, if the N.sup.th point-in-time snapshot is the specified snapshot, the post-merge single difference bitmap can be used as the transfer difference bitmap. Further, in this example, memory module consumption can be curbed.

As another preferred example, for example, a difference bitmap that has been associated to a snapshot that does not need to be copied to the secondary site (in other words, for example, a difference bitmap relating to one or more snapshots between the copy-targeted snapshots) is merged with the transfer difference bitmap, and the difference bitmap serving as the basis of the merge is deleted. Memory module consumption can be curbed in this example as well.

Furthermore, at least one of the above-mentioned snapshot acquisition module, copy control module, difference information acquisition module and copy difference information creation module can be constructed using hardware, a computer program, or a combination of these (for example, one module can be realized using a computer program, and the remainder can be realized using hardware). The computer program is executed by being read into a processor. Further, when information processing is being carried out by the computer program being read into the processor, a storage area that exists in a hardware resource such as a memory can be used. Further, the computer program can be installed in a computer from a CD-ROM or other such storage medium, or can be downloaded to the computer via a communications network.

BRIEF DESCRIPTION OF THE DRAWINGS

FIG. 4 is a diagram showing an example of a COW management table of the first embodiment;

FIG. 5 is a diagram showing an example of a block usage bitmap of the first embodiment;

FIG. 6 is a diagram showing an example of a COW bitmap of the first embodiment;

FIG. 7 is a diagram showing an example of a difference bitmap management table of the first embodiment;

FIG. 10 is a flowchart showing an example of the operation of a snapshot deletion module of the first embodiment;

FIG. 11 is a flowchart showing an example of the operation of a read processing module of the first embodiment;

FIG. 21 is a diagram showing an example of a post-merge merged difference bitmap management table of the third embodiment;

FIG. 22 is a diagram showing an example of a copy-targeted snapshot selection screen of the third embodiment;

DESCRIPTION OF THE PREFERRED EMBODIMENTS

A number of embodiments of the present invention will be explained in detail by referring to the figures.

Embodiment 1

Figure 1:
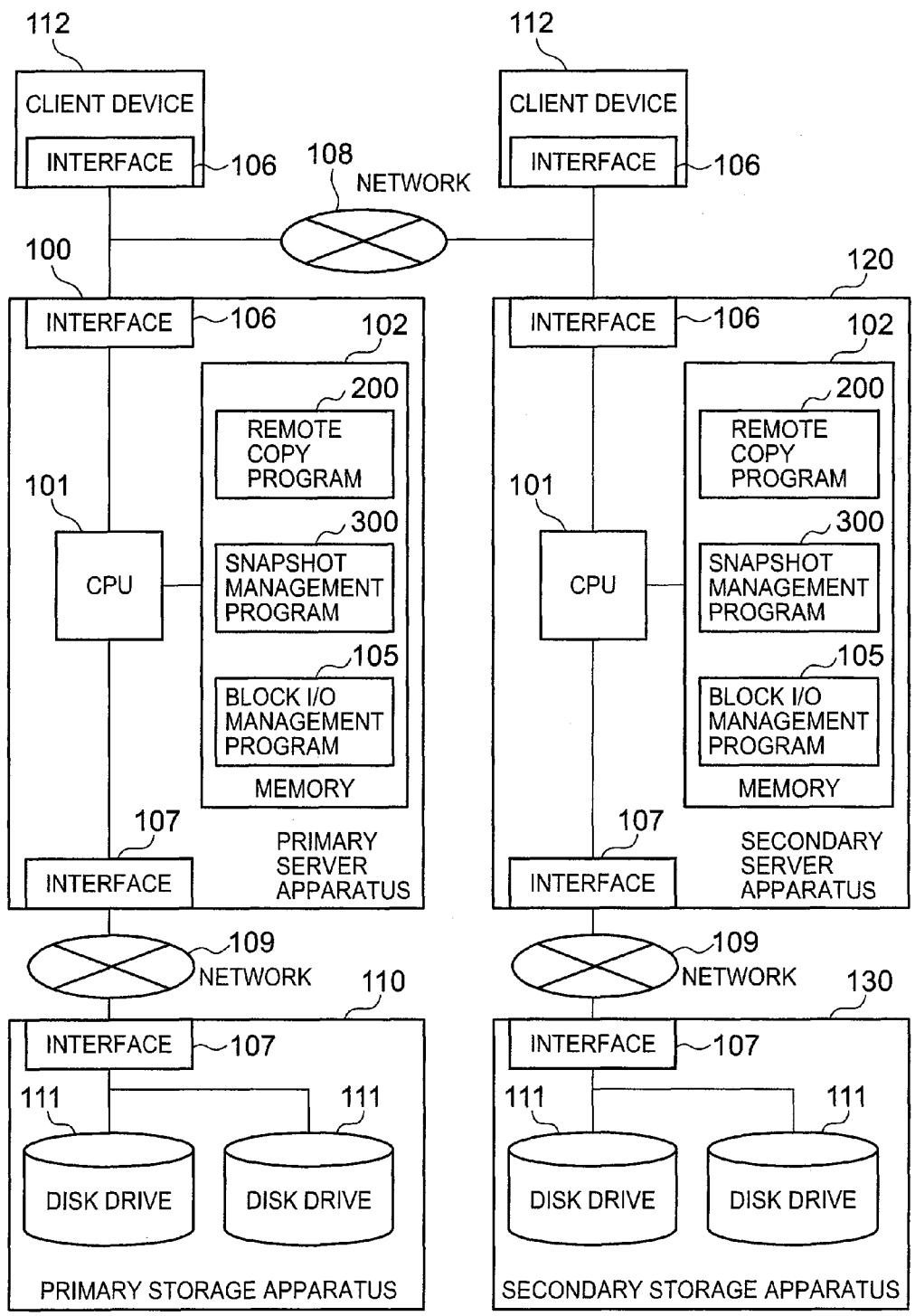
FIG. 1 is a diagram showing an example of the configuration of a storage system of a first embodiment of the present invention.

FIG. 1 shows an example of the configuration of a storage system of a first embodiment of the present invention.

A storage system is configured from a primary server apparatus 100; a primary storage apparatus 110; a client device 112; a secondary server apparatus 120; and a secondary storage apparatus 130.

The primary storage apparatus 110 is connected to the primary server apparatus 100 by way of a network 109. Similarly, the secondary storage apparatus 130 is connected to the secondary server apparatus 120 by way of a different network 109. Both networks 109, for example, are SAN (Storage Area Network).

The client device 112 is connected to the primary server apparatus 100 and the secondary server apparatus 120 by way of a network 108. The network 108, for example, is a LAN (Local Area Network).

The primary server apparatus 100 is connected to the secondary server apparatus 120 by way of the network 108. The primary server apparatus 100 remotely copies data of the primary server apparatus 100 to the secondary server apparatus 120. Hereinafter, the primary server apparatus 100 and primary storage apparatus 110 may be combined and called a "primary site", and the secondary server apparatus 120 and secondary storage apparatus 130 may be combined and called the "secondary site".

Next, the server apparatus, storage apparatus and client device will each be explained.

The primary server apparatus 100 and secondary server apparatus 120 comprise a CPU (Central Processing Unit) 101; memory 102; interface 106; and interface 107. The CPU 101 functions as a control module for carrying out processing. The memory 102 holds data required for processing in either server apparatus 100 or 120, and software executed by the CPU 101. The interface 106 is a connector for carrying out a data transfer by connecting the primary server apparatus 100, secondary server apparatus 120 and client device 112. The interface 107 is a connector for carrying out a data transfer by connecting the primary server apparatus 100 and the primary storage apparatus 110 (and the secondary server apparatus 120 and secondary storage apparatus 130).

Normally, a variety of programs are running on the server apparatuses 100 and 120. For example, the server apparatuses 100 and 120 are Network Attached Storage (NAS) apparatuses, and in this case, the programs running on the server apparatuses 100 and 120 include various programs such as an NFS (Network File System) server program and a DBMS (Database Management System). However, since the focus here will be on explaining a remote copy function and a snapshot function, these programs are not shown in the figure.

As software that runs on the primary server apparatus 100 and the secondary server apparatus 120 in addition to these programs, there are a remote copy program 200, a snapshot management program 300, and a block I/O management program 105 stored in the memory 102. Hereinbelow, when the term computer program is the subject of a sentence, in actuality, processing is being carried out by the CPU 101 that executes this computer program.

Of the primary server apparatus 100 and secondary server apparatus 120 of this embodiment, it is the primary server apparatus 100 that has characteristic features, and as such, the primary server apparatus 100 will mainly be explained in the following explanation. Specifically, in the following explanations, the explanations of the remote copy program 200, snapshot management program 300, and block I/O management program 105, unless otherwise noted, will explain the programs that run on the primary server apparatus 100.

The remote copy program 200 is for copying via the network 108 data inside a logical volume being managed by the primary server apparatus 100 to a logical volume being managed by the secondary server apparatus 120.

The snapshot management program 300, for example, is equivalent to the LVM in the Linux Kernel. The snapshot management program 300 manages logical volumes, such as the operational volume, differential volume and snapshot volume (hereinafter, simply referred to as the "snapshot"), and makes it possible to access the respective logical volumes from the client device 112. Furthermore, the snapshot management program 300 manages inter-snapshot differences for use by the remote copy program 200.

The block I/O management program 105 converts a logical volume access request from the snapshot management program 300 to an access command for the primary storage apparatus 110, and sends this access command to the primary storage apparatus 110. For example, the block I/O management program 105 is equivalent to the block device driver and SCSI driver of the Linux Kernel.

The primary storage apparatus 110 and secondary storage apparatus 130 comprise at least one disk drive 111 as a data storage function, and an interface 107, which is a connector for carrying out a data transfer by connecting to the primary server apparatus 100 (or secondary server apparatus 120).

The disk drive 111 can be accessed in block units, which is a data management unit of a certain fixed size. That is, the access destination is specified in block units at data access time, such as a data read or write. The disk drive 111 can be a standalone disk drive device, or respective sub-storage areas (areas called partitions) that configure a storage area provided by the disk drive device. Or, the disk drive 111 can be either a RAID (Redundant Arrays of Inexpensive Disks) group, which is a collection of a plurality of disk drive devices, or a logical storage device, which is formed based on the storage space of this RAID group. In this embodiment, it is supposed that one disk drive 111 each is made correspondent to the operational volume and the differential volume. Furthermore, the disk drive device, for example, is a hard disk drive (HDD), but a different type of physical storage device, such as a DVD (Digital Versatile Disk) drive or flash memory device can also be used.

The client device 112 comprises an interface 107, which is a connector for carrying out a data transfer by connected to the primary server apparatus 100 or secondary server apparatus 120. The client device 112 accesses the primary server apparatus 100 and secondary server apparatus 120 via the network 108, and uses the NFS server program or the like provided by the server apparatus.

Figure 2:
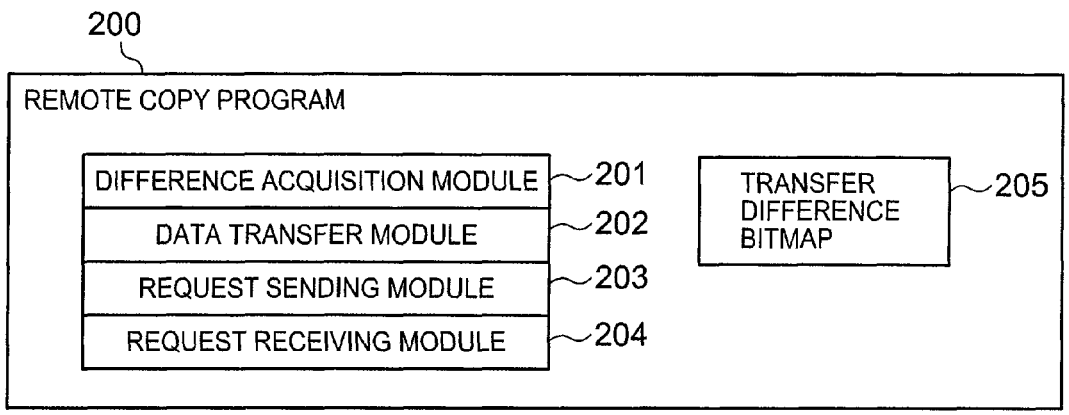
FIG. 2 is a diagram showing an example of the configuration of a remote copy program of the first embodiment.

FIG. 2 is a diagram showing an example of the configuration of the remote copy program 200. Hereinafter, a snapshot, from among one or more snapshots that have been remote copied, that is created at a time nearest to the present time will be called the "base snapshot". Further, a snapshot, which is a generation snapshot of subsequent to the base snapshot, and which is the target of a remote copy, will be called a "target snapshot". Further, the respective blocks (storage areas) that configure the base snapshot will be called "base blocks" and the respective blocks that configure the target snapshot will be called the "target blocks".

The remote copy program 200 copies a snapshot that exists in the primary storage apparatus 110 to the secondary storage apparatus 130 via the network 108 by using the remote copy program 200 of the secondary server apparatus 120. The remote copy program 200 has a difference acquisition module 201; a data transfer module 202; a request sending module 203; and a request receiving module 204, and can create a transfer difference bitmap 205.

The difference acquisition module 201 carries out the acquisition of the difference between the base snapshot and the target snapshot. The reason for acquiring the difference is to carry out a remote copy efficiently by copying only the data (difference data) corresponding to the difference between the base snapshot and the target snapshot instead of the entire target snapshot. The difference acquisition module 201 executes a difference bitmap creation module 305 of the snapshot management program 300 to create a transfer difference bitmap 205. The transfer difference bitmap 205 shows the difference between the base snapshot and the target snapshot. The respective bits that configure the transfer difference bitmap 205 correspond to the respective blocks (storage areas) that configure either the operational volume or the snapshot. To make the explanation easier to understand, it is supposed that a bit and a block correspond to one another on a one-to-one basis, but a plurality of blocks can also be made correspondent to respective bits.

The data transfer module 202 creates request data, which is a collection of remote copy target data, based on the transfer difference bitmap 205. Specifically, if a certain bit in the transfer difference bitmap 205 is OFF ("0"), it is clear that there is no difference between the base block and the target block corresponding to this bit. Therefore, the data that corresponds to this certain bit "0" is not treated as a copy target. Conversely, if a certain bit in the transfer difference bitmap 205 is ON ("1"), it is clear that there is a difference between the base block and the target block corresponding to this bit. In this case, the data transfer module 202 refers to a COW management table 400, which will be explained further below, to specify the location of the difference data corresponding to this certain bit "1", and reads out the difference data from the specified location. This read-out difference data is treated as copy target data.

The request sending module 203 sends request data to the remote copy program 200 of the partner site via the interface 106. For example, the request sending module 203 of the primary site sends the request data created by the data transfer module 202 to the secondary site.

The request receiving module 204 receives via the interface 106 the request data that has been sent from the remote copy program 200 of the partner site. For example, the request receiving module 204 of the secondary site receives the request data sent from the primary site.

Figure 3:
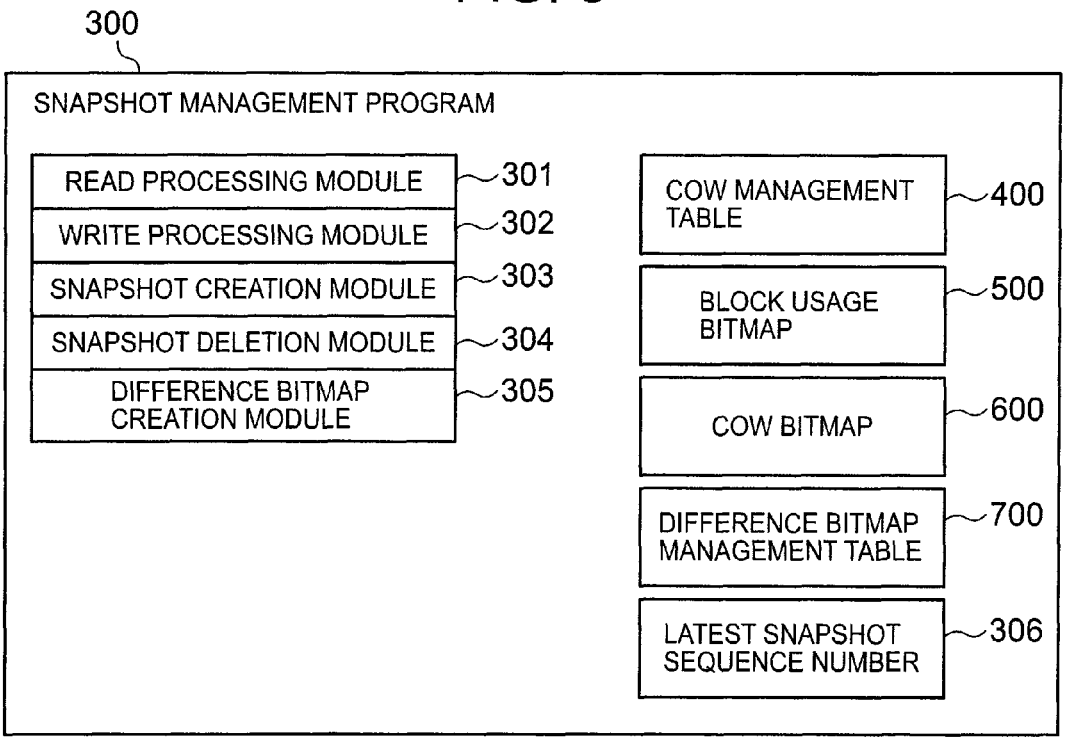
FIG. 3 is a diagram showing an example of the configuration of a snapshot management program of the first embodiment.

FIG. 3 is a diagram showing an example of the configuration of the snapshot management program 300.

The snapshot management program 300, which controls access to the operational volume and the differential volume from the respective types of programs inside the primary server apparatus 100, is for realizing the snapshot function. The snapshot management program 300 has a read processing module 301; a write processing module 302; a snapshot creation module 303; a snapshot deletion module 304; and a difference bitmap creation module 305. Further, the snapshot management program 300 manages the COW management table 400; a block usage bitmap 500; a COW bitmap 600; a difference bitmap management table 700 and a latest snapshot sequence number 306.

The read processing module 301 is executed to reference data inside the operational volume and data inside the snapshot using the COW management table 400 and COW bitmap 600. The processing carried out by the read processing module 301 will be explained in detail hereinbelow using FIG. 11.

The write processing module 302 is executed to control a write to the operational volume, and to maintain a snapshot. The write processing module 302 is called up every time a write to the operational volume takes place, and, if necessary, copies difference data to the differential volume, and carries out a write of write-targeted data to the operational volume after updating the COW management table 400 and COW bitmap 600. The processing carried out by the write processing module 302 will be explained in detail hereinbelow using FIG. 12.

The snapshot creation module 303 is executed to create a snapshot of the operational volume. After the snapshot creation module 303 has created a snapshot of a certain generation, access to this certain generation snapshot becomes possible. The snapshot creation module 303 updates the COW management table 400, COW bitmap 600 and difference bitmap management table 700. The processing carried out by the snapshot creation module 303 will be explained in detail hereinbelow using FIG. 9.

The snapshot deletion module 304 is executed when deleting a snapshot that has been created. The snapshot deletion module 304 updates the COW management table 400, block usage bitmap 500 and difference bitmap management table 700, and carries out processing that frees the block, from among a plurality of blocks configuring a differential volume, that is storing the component data of the snapshot to be deleted. The processing carried out by the snapshot deletion module 304 will be explained in detail hereinbelow using FIG. 10.

The difference bitmap creation module 305 is executed when the difference acquisition module 201 of the remote copy program 200 has requested a transfer difference bitmap. The difference bitmap creation module 305 refers to the difference bitmap management table 700 or COW management table 400 to create a transfer difference bitmap. The processing of the difference bitmap creation module 305 will be explained in detail hereinbelow using FIG. 13.

FIG. 4 shows an example of a COW management table 400. In the explanation that follows, the respective blocks that configure the operational volume will be called "operational blocks", and the respective blocks that configure the differential volume will be called "difference blocks".

The COW management table 400 is for storing the location of the data that configures the snapshot. This COW management table 400 corresponds to the snapshot management information described hereinabove.

The COW management table 400 holds for each snapshot an operational block address (operational volume block address) 401; and the copy-destination block addresses of the data inside this operational block 402, 403, . . . , 40n. In addition, the COW management table 400 holds for each snapshot a sequence number for uniquely identifying the snapshot. In this embodiment, it is supposed that there are p number of operational blocks, and that a maximum of n snapshots can be created. For this reason, the operational volume block address has p rows from 0 to p−1, and there are n columns of snapshots from 1 to n. Hereinbelow, a block which is allocated block address k will be notated as "block k" (k being a integer from 0 to p−1).

For example, copy-destination block address "32" is recorded at the location where row 411 intersects with column 402. That is, it is clear that difference block 32 can be referenced when referring to block 0 of snapshot 1. Further, copy-destination block address "0" is recorded at the location where row 411 intersects with column 403. Copy-destination block address "0" shows that a COW has not occurred (that is, a difference has not occurred) for the corresponding operational block (In this embodiment, difference block 0 does not constitute a copy-destination block.). Therefore, it is clear that operational block 0 can be referenced when referring to block 0 of snapshot 2. Further, in column 405, which corresponds to snapshot n, the value in all the cells is "–" (null). This shows a state in which snapshot n has not been created.

Further, row 410 shows the sequence numbers of the respective snapshots. For example, the sequence number of snapshot 1 is "1" according to the location where row 410 intersects with column 402. A sequence number, which uniquely identifies and manages a snapshot, is held in the respective snapshot columns of the COW management table 400. Since the number of storable snapshots is limited, when an old snapshot is deleted and a new snapshot is created, the number representing the generation of the snapshot is reused, but the sequence number is definitely not reused, and is managed uniquely. Therefore, the numbers representing the sequence number and the snapshot generation will differ ordinarily, but may be the same temporarily.

Furthermore, in this embodiment, this COW management table 400 is stored in the memory 102, but could also be stored in the disk drive 111 instead.

FIG. 5 shows an example of a block usage bitmap 500.

The block usage bitmap 500 is for managing the usage status of the respective difference blocks. In this embodiment, it is supposed that there are q number of difference blocks. The block usage bitmap 500 holds a usage status flag (bit) showing whether or not the respective addresses of these q number of difference blocks are being used. A usage status flag of "1" signifies that the difference block corresponding to this flag is in use, and a usage status flag of "0" signifies that the difference block corresponding to this flag is not in use.

FIG. 6 shows an example of the COW bitmap 600.

The COW bitmap 600 is for managing whether or not it is necessary to copy (save) the data inside an operational block to the differential volume. The COW bitmap 600 holds a COW status flag (bit) showing whether or not the operational block needs to be copied to the differential volume for each address of the p number of operational blocks. A COW status flag of "1" signifies that the data inside the operational block corresponding to this flag need not be copied to the differential volume even if the pertinent operational block has been updated, and a COW status flag of "0" signifies that the data inside the operational block corresponding to this flag needs to be copied to the differential volume if the pertinent operational block has been updated.

Furthermore, whether or not the data inside an updated operational block has to be copied to the difference storage bitmap can also be specified from the COW management table 400. Copy-destination block address "0" in the column of the latest generation snapshot of the COW management table 400 shows that a COW has yet to occur for the operational block corresponding to this address. That is, the COW status flag corresponding to the pertinent operational block in the COW bitmap 600 constitutes "0". The reason for storing the COW bitmap 600 is because it is possible to acquire the COW status (whether or not copying has been completed) of a desired block faster from the COW bitmap 600 than from the COW management table 400. This is more effective when the COW management table 400 resides in the disk drive 111 instead of the memory 102.

Of the COW bitmap 600 and COW management table 400, it is the COW management table 400 that is referenced as needed at the time of a remote copy if the target snapshot (the remote copy-targeted snapshot) is a generation snapshot between the base snapshot and the latest generation snapshot. Meanwhile, if the target snapshot is the latest generation snapshot, at least the COW management table 400 of the COW bitmap 600 and COW management table 400 is referenced as needed at the time of a remote copy.

Specifically, when the target snapshot is a generation snapshot between the base snapshot and the latest generation snapshot and a certain bit of the transfer bitmap 205 is "1", the location (the block address of either the operational block or the difference block) of the difference data corresponding to the certain "1" bit is specified by referencing the column corresponding to the target bitmap inside the COW management table 400.

Conversely, when the target snapshot is the latest generation snapshot and a certain bit of the transfer bitmap 205 is "1", the location of the difference data corresponding to the certain "1" bit is specified by referencing the COW bitmap 600 (and the COW management table 400). For example, if the bit in the COW bitmap 600 that corresponds to the certain "1" bit is "0", the data stored in the operational block (block inside the operational volume) corresponding to the certain "1" bit is copy-targeted data. Conversely, if the bit in the COW bitmap 600 that corresponds to the certain "1" bit is "1", the data stored in the difference block (block inside the differential volume) corresponding to this "1" bit is copy-targeted data.

FIG. 7 shows an example of a difference bitmap management table 700.

The difference bitmap management table 700 is for storing a difference bitmap that shows the difference between the pertinent snapshot and the snapshot of one generation previous thereto for each snapshot. The respective bits that configure the difference bitmap correspond to the respective operational blocks.

Specifically, the difference bitmap management table 700 holds an operational block address (operational volume block address) 701; and a bit corresponding to this operational block (a difference bitmap component) 702, 703, . . . , 70n. In addition, the same as the COW management table 400, the difference bitmap management table 700 holds for each snapshot a sequence number in row 710 for uniquely identifying the snapshot.

An operational block that has been updated between the point in time that a certain generation snapshot n−1 was created and the point in time at which snapshot n is to be created is set to a "1" bit, an operational block that has not been updated is set to "0" bit.

For example, the difference bitmap that shows the difference between snapshot 1 and snapshot 2 is held in column 703 of snapshot 2. For example, a "1" bit is configured at the location where row 711 intersects with column 703. Thus, it is clear that operational block 0 has been updated between the time that snapshot 1 was created and the time that snapshot 2 was created. Further, for example, a "0" bit is configured in the location where row 712 intersects with column 703. Thus, it is clear that operational block 1 was not updated between the time that snapshot 1 was created and the time that snapshot 2 was created. Further, the value "–(null)" is configured in all of the cells that configure column 705. This shows a state in which a snapshot n has not been created and a difference has not been fixed.

Furthermore, the manner in which the difference bitmap management table 700 is created will be explained further below using FIG. 9.

The latest snapshot sequence number 306 shown in FIG. 3 is information for holding that snapshot, of the snapshots managed by the snapshot management program 300, which is the latest snapshot. The latest snapshot sequence number 306, for example, is an integer. The latest snapshot sequence number 306 is incremented by 1 each time a snapshot is created, and the number 306 subsequent to being incremented by 1 is treated as the sequence number of the latest generation snapshot that has been created.

The preceding has been an explanation related to the configuration of the snapshot management program 300.

Figures 8, 9:
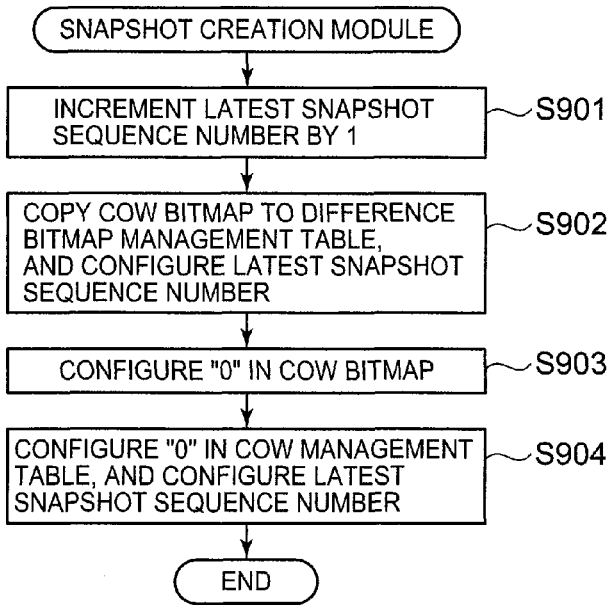
FIG. 8 is a diagram showing an example of the creation of a difference bitmap between snapshots of arbitrary generations in the first embodiment.
FIG. 9 is a flowchart showing an example of the operation of a snapshot creation module of the first embodiment.

FIG. 8 shows an example for creating a difference bitmap between the base snapshot and the target snapshot. In this example, the base snapshot is "snapshot 1", and the target snapshot is "snapshot 3".

Column 801 shows the block addresses of the operational volume. Column 802 shows the difference bitmap held in column 703 of the difference bitmap management table 700 (the bitmap that shows the difference between snapshot 1 and snapshot 2). Column 803 shows the difference bitmap held in column 704 of the difference bitmap management table 700 (the bitmap that shows the difference between snapshot 2 and snapshot 3). Column 804 shows the bitwise-OR of the difference bitmap inside column 802 and the difference bitmap inside column 803. This is the bitmap that shows the difference between snapshot 1 and snapshot 3, that is, the difference bitmap that shows which operational blocks were updated from the time that snapshot 1 was created until the time that snapshot 3 was created.

For example, in row 811, in which the operational volume block address is 0, the bit inside the difference bitmap between snapshots 1 and 2 is "1" (there is a difference), and the bit inside the difference bitmap between snapshots 2 and 3 is "0" (there is no difference). That is, a "1" bit (there is a difference) is configured in the location where row 811 intersects with column 804 because a difference exists in operational block 0 between snapshot 1 and snapshot 3. Further, in row 812, in which the operational volume block address is 1, the bit inside the difference bitmap between snapshots 1 and 2 and the bit inside the difference bitmap between snapshots 2 and 3 are both "0" (there is no difference). That is, a "0" bit (there is no difference) is configured in the location where row 812 intersects with column 804 because a difference does not exist in operational block 1 between snapshot 1 and snapshot 3.

As will be explained hereinbelow, the duplicate of the difference bitmap, which is the bitwise-OR (that is, the difference bitmap configured in column 804) is the transfer difference bitmap 205 that is used at the time of a remote copy.

The flows of the processing carried out by the respective modules configuring the snapshot management program 300 will be explained hereinbelow using FIGS. 9 to 13.

FIG. 9 is an example of the flow of processing that shows the operation of the snapshot creation module 303. The snapshot creation module 303, for example, is executed when a snapshot create indication (for example, a create indication comprising a snapshot number) is received from the client device 112 (or a not-shown management device connected to the network 108). The snapshot number to be created can be specified to the snapshot creation module 303 using another method.

First, the snapshot creation module 303 increments by 1 the latest snapshot sequence number 306 (S901).

Next, the snapshot creation module 303 copies the COW bitmap 600 in the column corresponding to the specified snapshot number of the difference bitmap management table 700, and configures in this column the latest snapshot sequence number 306 subsequent to being incremented by 1 in S901 (S902). A "1" bit is configured in the COW bitmap 600 copied to the difference bitmap management table 700 for the operational block that has undergone a COW, that is, the operational block in which was stored the data copied to the differential volume. Since this COW-processed operational block is synonymous with the operational block that has been updated between the time subsequent to the creation of the immediately previous generation snapshot until the current point in time, the COW bitmap 600 of the current point in time can be copied as-is to the difference bitmap management table 700 as a difference bitmap between the immediately previous generation snapshot and the snapshot about to be created currently, without undergoing any special conversion processing.

Next, the snapshot creation module 303 configures all the bits configuring the COW bitmap 600 to "0" (S903). That is, the COW bitmap 600 is reset. Consequently, the COW status of all the operational blocks becomes a state in which a data copy to the differential volume is needed if an update occurs.

Then, the snapshot creation module 303 configures "0" in the column corresponding to the snapshot number specified at the time of execution for all the block addresses of the operational volume in the COW management table 400, and configures the post-increment latest snapshot sequence number 306 in this column (S904).

FIG. 10 is an example of the processing flow that shows the operation of the snapshot deletion module 304. The snapshot deletion module 304, for example, is executed when a snapshot delete indication (for example, a delete indication that comprises a snapshot sequence number) specifying a delete-targeted snapshot is received from the client device 112 (or a not-shown management device that is connected to the network 108). The delete-targeted snapshot can also be specified to the snapshot deletion module 304 using another method.

First, the snapshot deletion module 304 configures the value "–(null)" in all the cells of the column (the column that has the specified snapshot sequence number) corresponding to the delete-targeted snapshot in the COW management table 400 (S1001).

Next, the snapshot deletion module 304 updates the status flag of the block usage bitmap 500 (S1002). Specifically, the snapshot deletion module 304 updates the status flag (bit) corresponding to the difference block that stores the data configuring the delete-targeted snapshot to "0", which signifies unused, in the block usage bitmap 500. Consequently, the difference block that stores the data configuring the delete-targeted snapshot is released. Furthermore, it is possible to specify which of the difference blocks is storing the data that configures the delete-targeted snapshot by referencing the COW management table 400. When this specified difference block is a difference block in which data configuring another snapshot is stored, the snapshot deletion module 304 does not release this specified difference block (that is, the status flag corresponding to this difference block is not changed from "1" to "0"). That is, the snapshot deletion module 304 decides whether or not to release the difference block storing the data that configures the delete-targeted snapshot after referencing the COW management table 306.

Then, the snapshot deletion module 304 configures all of the cells corresponding to the delete-targeted snapshot to "–(null)" in the difference bitmap management table 700 (S1001).

FIG. 11 is an example of the processing flow that shows the operation of the read processing module 301. It is supposed that read processing is carried out for either the operational volume or the snapshot.

First, the read processing module 301 receives a read request, and determines if the logical volume specified in this request is a snapshot (S1101). The read request, for example, is received from a higher-level program (for example, a file system). The read-source logical volume and a block inside this logical volume are specified in the read request. Specifically, for example, the read request comprises a logical volume ID and a block address.

If a snapshot is not specified in the read request (S1101: NO), the read processing module 301 reads out the data from the operational block inside the operational volume specified in the read request (S1103), and ends.

Conversely, if a snapshot is specified in the read request (S1101: YES), the read processing module 301 references the row of the COW management table 400 corresponding to the specified block, and determines whether or not the value of the copy-destination block address of the reference destination is "0" (S1102). If the value of the copy-destination block address of the reference destination is "0" (S1102: YES), the read-targeted data resides in the operational volume instead of the differential volume, and as a result, the read processing module 301 reads out the data from the specified block of the operational volume (S1103), and ends. If the value of the copy-destination block address of the reference destination is not "0" (S1102: NO), the read-targeted data has been copied to the differential volume, and therefore the read processing module 301 reads out the data from the difference block designated according to the copy-destination block address of the reference destination (S1104), and ends.

Figure 12:
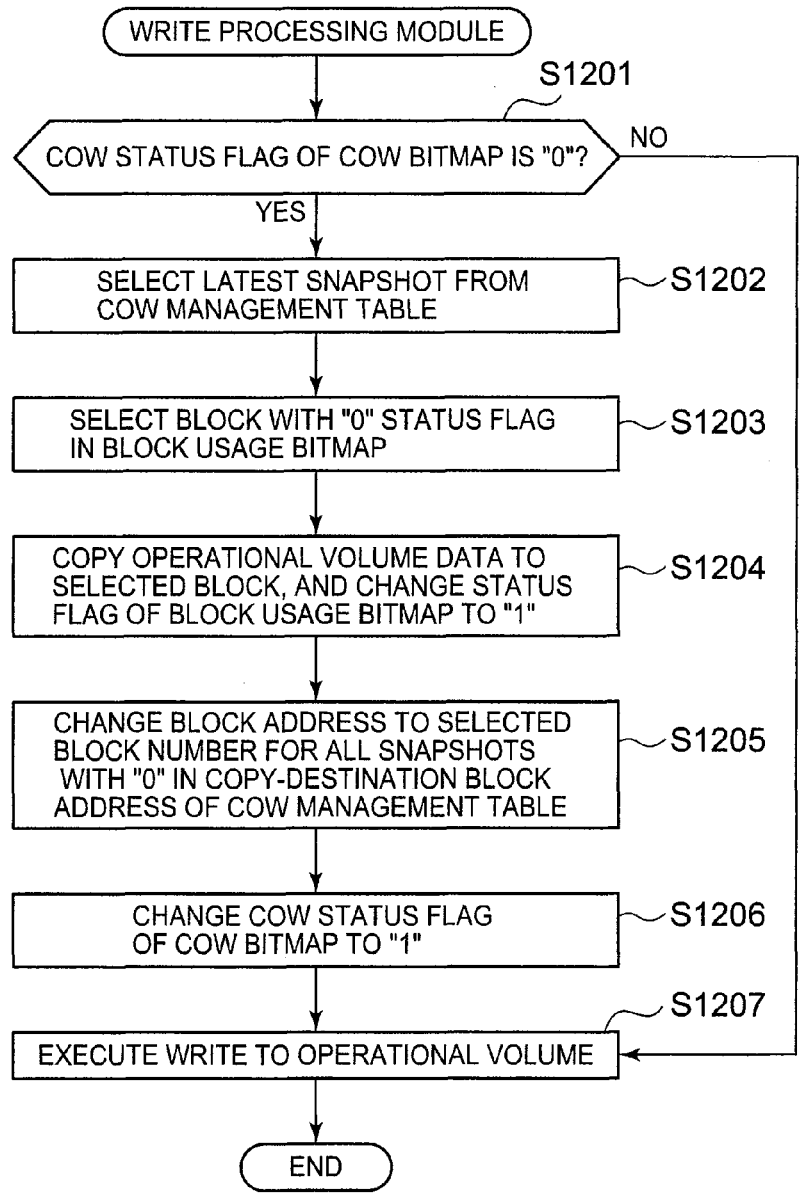
FIG. 12 is a flowchart showing an example of the operation of a write processing module of the first embodiment.

FIG. 12 is an example of the processing flow that shows the operation of the write processing module 302. In write processing, a data write to the operational volume is carried out. In addition, as needed, the copying of the data stored in the write-destination operational block is also carried out to the differential volume in advance of the data write to the operational volume.

First, upon receiving the write request, the write processing module 302 references the COW bitmap 600, and determines if the COW status flag of the write-destination operational volume is "0" (S1201). The write request, for example, is received from a higher-level program (for example, a file system). A write-destination operational volume and an operational block are specified in the write request. Specifically, for example, the write request comprises an operational volume ID and an operational block address.

If the COW status flag of the reference destination is "1" (S1201: NO), the write processing module 302 executes a write of the write-targeted data to the specified operational block (S1207), and ends. If the COW status flag of the reference destination is "0" (S1201: YES), the write processing module 302 continues to carry out the following processing because the operational volume data must be copied to maintain the snapshot.

That is, the write processing module 302 references the latest snapshot sequence number 306, and selects the column of the latest snapshot (the column comprising the latest snapshot sequence number 306 of the reference destination) in the COW management table 400 (S1202). Next, the write processing module 302 references the block usage bitmap 500, and selects a difference block having a status flag of "0" (unused) (S1203). Next, the write processing module 302 copies the data inside the write-destination operational block to the difference block selected in S1203, and changes the status flag of the block usage bitmap 500 corresponding to this difference block to "1" (in use) (S1204). Next, from among the copy-destination block addresses (the copy-destination block addresses in the COW management table 400) corresponding to the write-destination operational block, the write processing module 302 changes the copy-destination block address "0" to the block number selected in S1203 for all the snapshots in which the copy-destination block address is "0" (S1205). Next, the write processing module 302 changes the COW status flag in the COW bitmap 600 that corresponds to the write-destination operational block to "1" (S1206). After having carried out the above processing, the write processing module 302 executes a write of the write-targeted data to the write-destination operational block (S1207), and ends.

Figure 13:
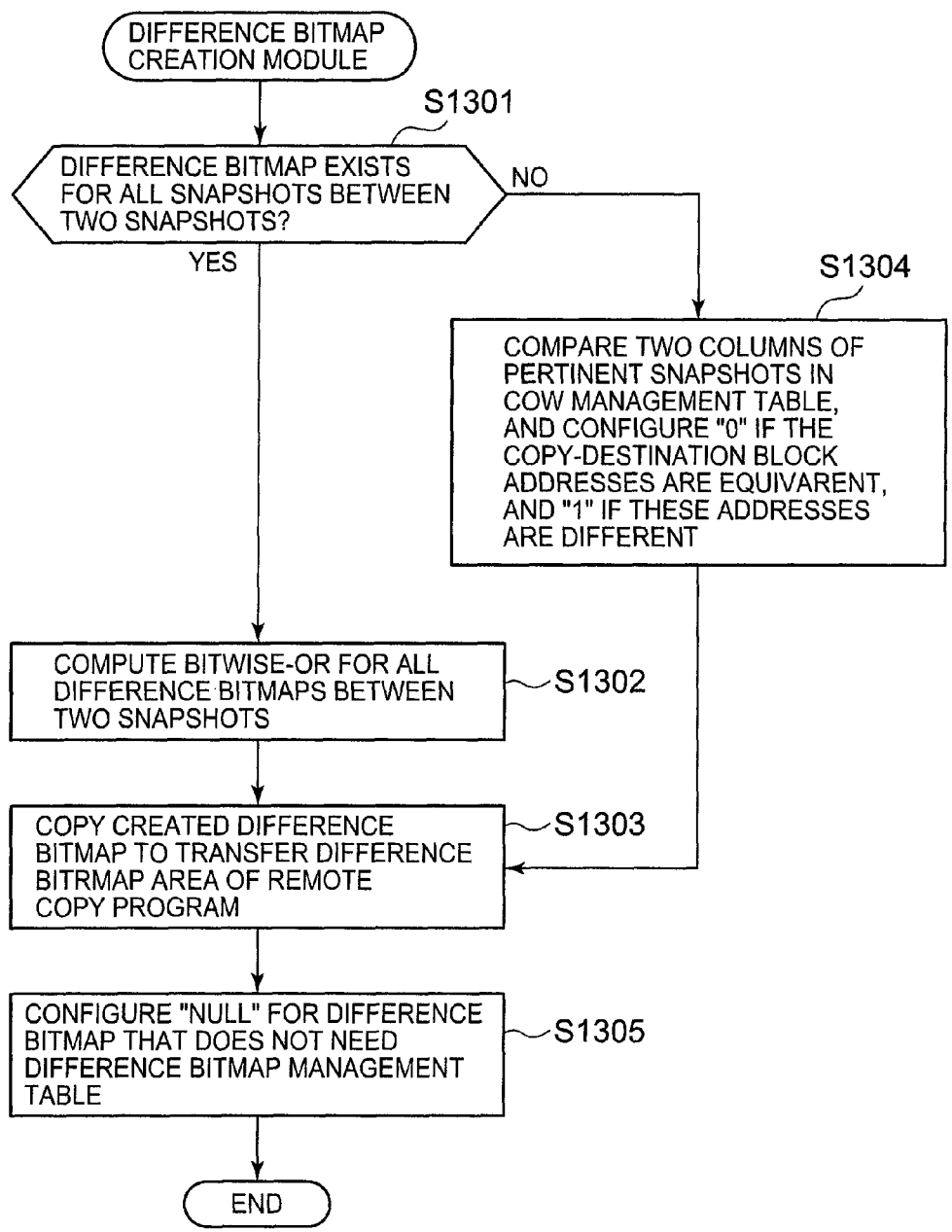
FIG. 13 is a flowchart showing an example of the operation of a difference bitmap creation module of the first embodiment.

FIG. 13 is an example of the processing flow that shows the operation of the difference bitmap creation module 305. When the difference acquisition module 201 of the remote copy program 200 requests a transfer difference bitmap, the difference bitmap creation module 305 references either the difference bitmap management table 700 or the COW management table 400 and creates a transfer difference bitmap. When the difference bitmap creation module 305 is executed, the sequence numbers of the two snapshots related to a desired difference are specified to the difference bitmap creation module 305 from the difference acquisition module 201 of the remote copy program 200. One of these two snapshots is the base snapshot, and the other is the target snapshot (that is, the remote copy-targeted snapshot). For example, the sequence number of the base snapshot (and/or the sequence number of the other snapshot) can be managed by the remote copy program 200, or the remote copy program 200 can discern this sequence number by querying the snapshot management program 300.

First, the difference bitmap creation module 305 determines if a difference bitmap exists for all the snapshots between the two snapshots specified at the time of execution (S1301). An example of a case in which the sequence numbers of the specified snapshots are "1" and "3" will be explained using FIG. 7. The difference bitmap that shows the difference between the sequence number "1" snapshot and the sequence number "2" snapshot is held in the column of snapshot 2 of sequence number 2 in column 703. Further, the difference bitmap that shows the difference between the sequence number "2" snapshot and the sequence number "3" snapshot is held in the column of snapshot 3 of sequence number 3 in column 704. Accordingly, a difference bitmap exists for all the snapshots between the snapshots specified at execution time (the sequence number "1" snapshot and the sequence number "3" snapshot) (S1302: YES).

In this case (S1301: YES), the difference bitmap creation module 305 computes the bitwise-OR for all the difference bitmaps between the snapshots (S1302). The method for creating a difference bitmap by computing the bitwise-OR is the same as was explained hereinabove by referring to FIG. 8.

When a difference bitmap does not exist between the snapshots (S1301: NO), the difference bitmap creation module 305 compares the two columns of these two snapshots in the COW management table 400, and creates a difference bitmap by configuring a "0" in the respective operational block addresses if the copy-destination block addresses are equivalent, and configuring a "1" if the copy-destination block addresses are different (S1304). Furthermore, the case of S1301: NO is one in which a difference bitmap does not exist (for example, was deleted) for at least one snapshot of the plurality of snapshots that exist between the two snapshots specified at the time of execution.

Then, the difference bitmap creation module 305 copies the difference bitmap created by the processing of either S1302 or S1304 to the area in which the transfer difference bitmap 205 is to be stored (S1303). Therefore, the difference bitmap copied to this area is used as the transfer difference bitmap 205 at the time of a remote copy.

Lastly, the difference bitmap creation module 305 configures "–(null)" in all the cells that configure the column corresponding to the difference bitmaps that have become unnecessary (the plurality of difference bitmaps serving as the basis of the difference bitmap created by the processing of either S1302 or S1304) in the difference bitmap management table 700 (S1305). That is, once the transfer difference bitmap 205 has been created and the remote copy has ended, the plurality of difference bitmaps that were used to create this transfer difference bitmap 205 will be no longer used. Therefore, the consumption of storage capacity (typically, the memory storage capacity) can be conserved by "–(null)" being respectively configured in the plurality of columns in which these difference bitmaps are stored. The same as above, in the example of FIG. 7, "–(null)" can be configured in column 703 and 704 in which the difference bitmaps that show the differences between the sequence number "2" snapshot and the sequence number "3" snapshot are stored. Furthermore, in preparation for when the remote copy that uses the created transfer difference bitmap 205 fails, this kind of release processing can be waited until the remote copy program 200 ends, or the difference bitmap can be held until the snapshot itself is deleted.

The preceding has been an explanation of this embodiment. Furthermore, in this embodiment, the respective difference data that configures the request data is transferred to the secondary site, and the transfer destination, for example, is the secondary site operational volume (secondary volume) that configures a volume pair with the primary site operational volume (primary volume). When the difference data is written to the secondary volume, the data stored in the write-destination block inside the secondary volume is saved (copied) to the differential volume of the secondary site, and the difference data is written to this write-destination block.

According to this embodiment, an inter-generational (inter-snapshot) difference bitmap is held for each snapshot, and a transfer difference bitmap is calculated using a bit operation for one or more difference bitmaps between the base snapshot and the target snapshot. Consequently, it is possible to rapidly create a transfer difference bitmap for a target snapshot of an arbitrary generation. In other words, there is no need to reference the COW management table 400 to create a transfer difference bitmap for an arbitrary generation target snapshot. This is more effective when the COW management table 400 resides in the disk drive 111 instead of the memory 102.

Embodiment 2

Next, a second embodiment of the present invention will be explained. The points of difference with the first embodiment will mainly be explained hereinbelow, and explanations of the points in common with the first embodiment will either be omitted or simplified.

Figures 14, 15:
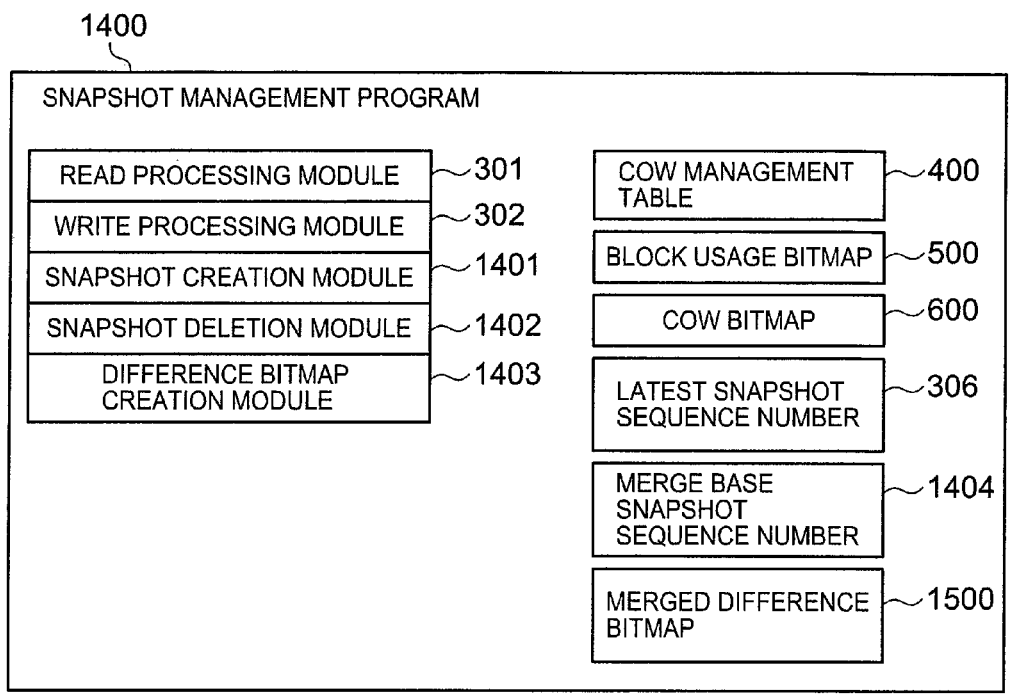
FIG. 14 is a diagram showing an example of the configuration of a snapshot management program of a second embodiment.
FIG. 15 is a diagram showing an example of a merged difference bitmap of the second embodiment.

FIG. 14 shows an example of the configuration of a snapshot management program 1400 of this embodiment.

The snapshot management program 1400 comprises a snapshot creation module 1401, snapshot deletion module 1402 and difference bitmap creation module 1403 that function differently from the snapshot creation module 303, snapshot deletion module 304 and difference bitmap creation module 305 of the first embodiment. The snapshot management program 1400 does not manage the difference bitmap management table 700 explained in the first embodiment. The snapshot management program 1400 manages a merge base snapshot sequence number 1404, and creates a merged difference bitmap 1500 on a timely basis.

FIG. 15 is an example of a merged difference bitmap 1500.

The merged difference bitmap 1500 holds a difference yes/no flag (bit) that shows the presence or absence of a difference for the respective operational blocks. Each time a snapshot is created, the merged difference bitmap 1500 merges (finds a bitwise-OR) with the COW bitmap 600 of that point in time. A merge base snapshot sequence number 1404 holds the latest snapshot sequence number 306 of the point in time at which the transfer difference bitmap 205 was created.

The transfer difference bitmap 205 is a merged difference bitmap 1500 that has been copied to the area in which the transfer difference bitmap 205 is stored. Therefore, the transfer difference bitmap 205 is a difference bitmap that shows the difference between the base snapshot and the latest generation snapshot. Therefore, in this embodiment, a transfer difference bitmap for the target snapshot can be created at high speed when the target snapshot is the latest generation snapshot.

The flow of processing in this embodiment will be explained below using FIGS. 16 to 18.

Figure 16:
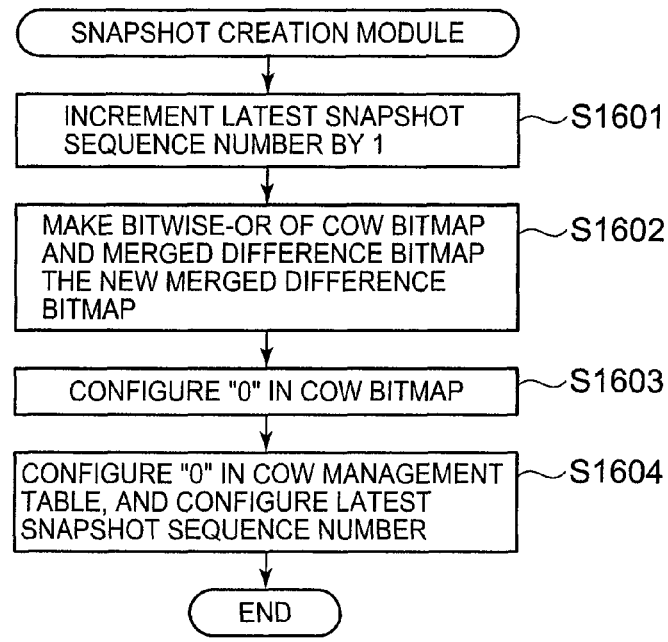
FIG. 16 is a flowchart showing an example of the operation of a snapshot creation module of the second embodiment.

FIG. 16 is an example of the processing flow that shows the operation of the snapshot creation module 1401.

Steps S1601, S1603 and S1604 of S1601 to S1604 are the same as S901, S903 and S904 shown in FIG. 9. In this embodiment, S1602 shown in FIG. 16 is carried out instead of S902 shown in FIG. 9.

That is, in S1602, the snapshot creation module 1401 makes the bitwise-OR of the COW bitmap 600 and merged difference bitmap 1500 of that point in time the new merged difference bitmap 1500. Consequently, it is possible to hold a block that has been updated in the operational volume between the time the base snapshot was created and the time the latest snapshot was created.

Figure 17:
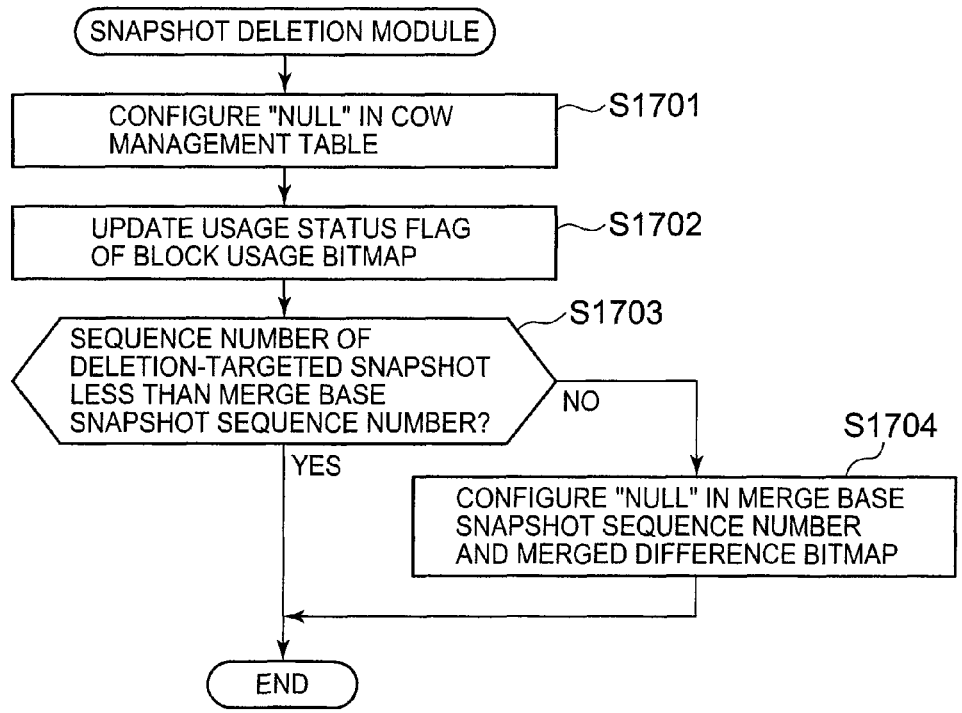
FIG. 17 is a flowchart showing an example of the operation of a snapshot deletion module of the second embodiment.

FIG. 17 is an example of the processing flow that shows the operation of the snapshot deletion module 1402.

Steps S1701 and S1702 of S1701 to S1704 are the same as S1001 and S1002 shown in FIG. 10. In this embodiment, S1703 and S1704 shown in FIG. 17 are carried out instead of S1003 shown in FIG. 10.

That is, in S1703, the snapshot deletion module 1402 determines whether or not the sequence number of the specified delete-targeted snapshot is less than the merge base snapshot sequence number 1404. When the result of the determination of S1703 is affirmative (S1703: YES), the snapshot deletion module 1402 ends deletion processing as-is. This is because the specified delete-targeted snapshot has nothing to do with the merged difference bitmap 1500 held up until this point in time.

Conversely, when the result of the determination of S1703 is negative (S1703: NO), the snapshot deletion module 1402 configures "–(null)" in the merge base snapshot sequence number 1404 and the merged difference bitmap 1500 (S1704). As a result of this, the respective bits configuring the merged difference bitmap 1500 are configured to "–(null)". This is because the merged difference bitmap 1500 will not match up with the actual difference bitmap.

Figure 18:
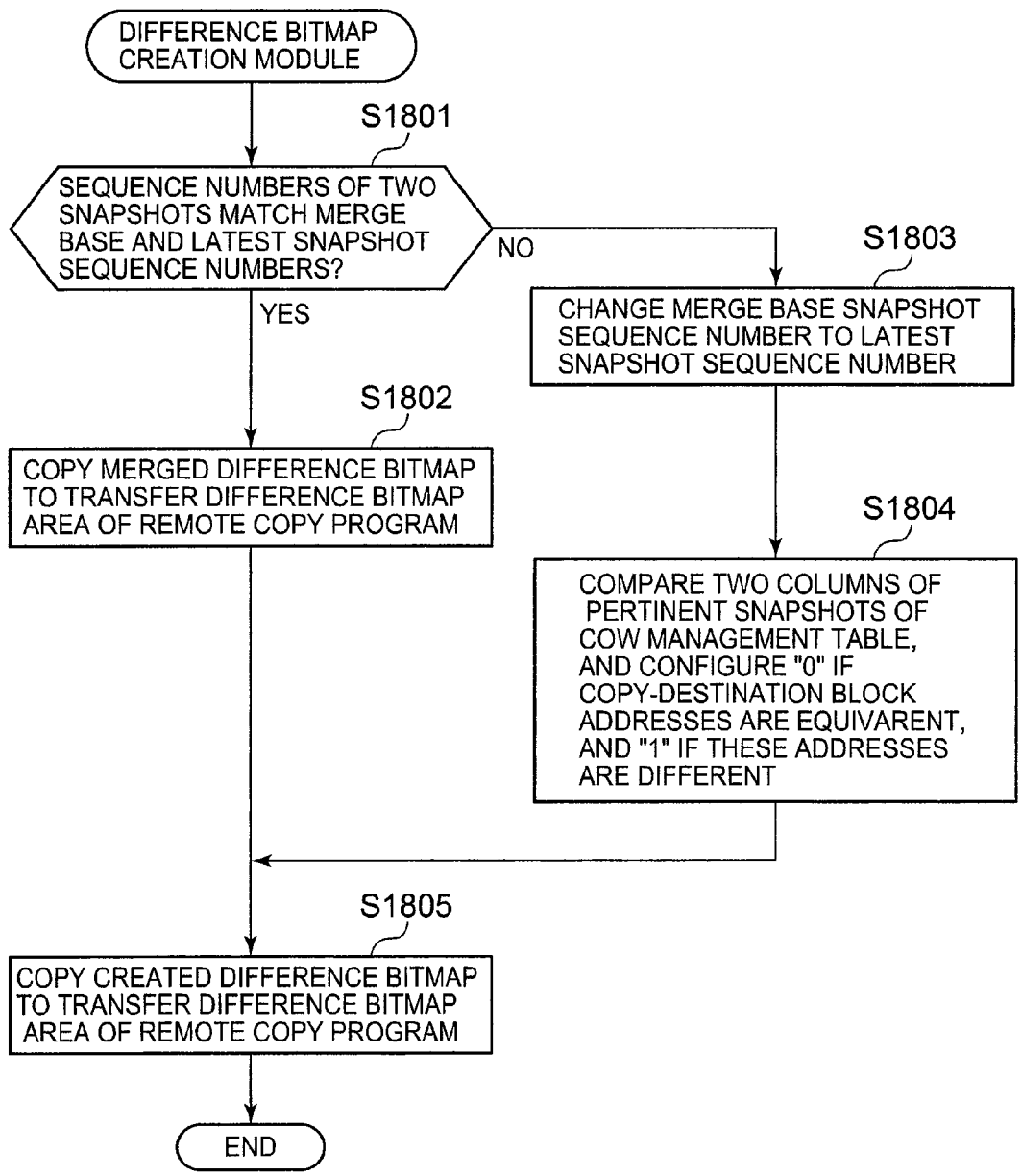
FIG. 18 is a flowchart showing an example of the operation of a difference bitmap creation module of the second embodiment.

FIG. 18 is an example of the processing flow that shows the operation of the difference bitmap creation module 1403.

When the difference acquisition module 201 of the remote copy program 200 requests a transfer difference bitmap, the difference bitmap creation module 1403 references either the merged difference bitmap 1500 or the COW management table 400, and creates a transfer difference bitmap. The same as in the first embodiment, when the difference bitmap creation module 1403 is executed, the sequence numbers of the two snapshots (the base snapshot and the target snapshot) related to a desired difference are specified.

First, the difference bitmap creation module 1403 determines whether or not the sequence numbers of the two snapshots specified at execution time coincide with the merge base snapshot sequence number 1404 and the latest snapshot sequence number 306 (S1801).

When the result of the determination of S1801 is affirmative (S1801: YES), the merged difference bitmap 1500 matches the desired difference bitmap, and thus the difference bitmap creation module 1403 copies the merged difference bitmap 1500 to the area of the transfer difference bitmap 205 of the remote copy program 200 (S1802). Then, the difference bitmap creation module 1403 changes the merge base snapshot sequence number 1404 to the same number as the latest snapshot sequence number 306 (S1805), and ends.

When the result of the determination of S1801 is negative (S1801: NO), the merged difference bitmap 1500 does not match up with the desired difference bitmap, and as such, the difference bitmap creation module 1403 references the COW management table 400, and creates a difference bitmap (S1803). That is, the difference bitmap creation module 1403 compares the two columns of the COW management table 400 corresponding to the two specified snapshots, and creates a difference bitmap by configuring a "0" if the copy-destination block addresses are equivalent, and configuring a "1" if the copy-destination block addresses are different. Then, the difference bitmap creation module 1403 copies the created difference bitmap to the area of the transfer difference bitmap 205 of the remote copy program 200 (S1804). Lastly, the difference bitmap creation module 1403 changes the merge base snapshot sequence number 1404 to the same number as the latest snapshot sequence number 306 (S1805), and ends.

The preceding has been an explanation of the second embodiment.

According to this embodiment, the contents of the COW bitmap 600 that shows the difference between a created latest generation snapshot and the immediately previous generation snapshot is merged with the merged difference bitmap 1500 each time a snapshot is created. When the target snapshot is the latest generation snapshot, a duplicate of the merged difference bitmap 1500 is treated as the transfer difference bitmap 205. Consequently, a transfer difference bitmap can be created at high speed for a target snapshot while reducing the consumption of storage capacity (memory capacity) more than in the first embodiment.

Embodiment 3

Next, a third embodiment of the present invention will be explained. The points of difference with the first embodiment will mainly be explained hereinbelow, and explanations of the points in common with the first embodiment will either be omitted or simplified.

Figures 19, 20:
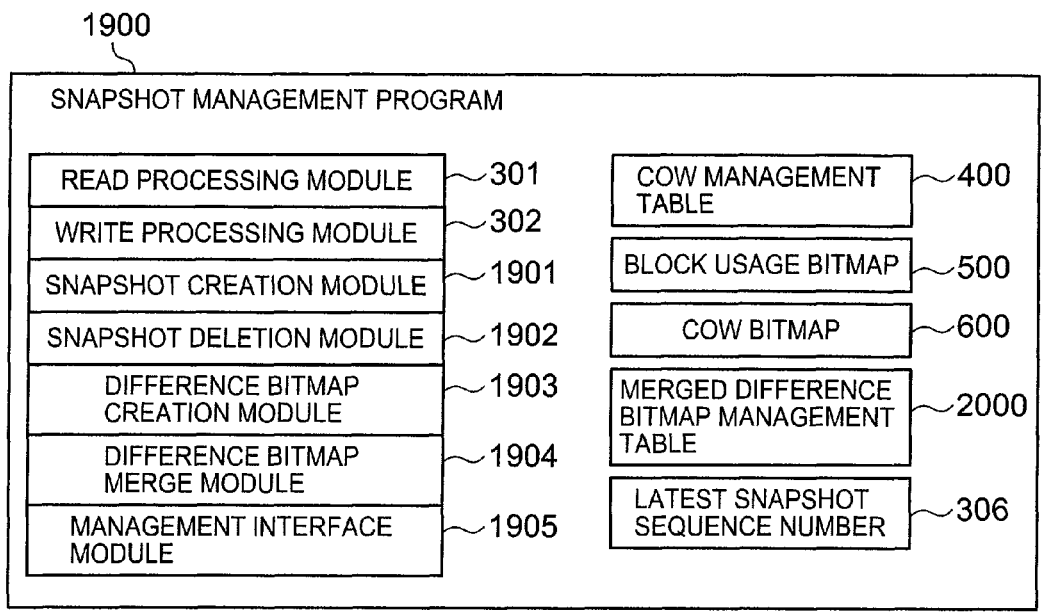
FIG. 19 is a diagram showing an example of the configuration of a snapshot management program of a third embodiment.
FIG. 20 is a diagram showing an example of a pre-merge merged difference bitmap management table of the third embodiment.

FIG. 19 shows an example of the configuration of the snapshot management program 1900 of this embodiment.

The snapshot management program 1900 comprises a snapshot creation module 1901, snapshot deletion module 1902 and difference bitmap creation module 1903 that function differently from the snapshot creation module 303, snapshot deletion module 304 and difference bitmap creation module 305 of the first embodiment. The snapshot management program 1900 also comprises a difference bitmap merge module 1904 and a management interface module 1905. The snapshot management program 1900 manages a merged difference bitmap management table 2000 instead of the difference bitmap management table 700 explained in the first embodiment. The merged difference bitmap management table 2000 is managed by the memory 102.

The difference bitmap merge module 1904 is executed when the system administrator selects a snapshot to be the target of a remote copy using the management interface module 1905, which will be explained below. The difference bitmap merge module 1904 merges a difference bitmap corresponding to a snapshot that is not the target of the remote copy with the difference bitmap corresponding to the snapshot that has become the target of the remote copy. Consequently, it is possible to curb the consumption of storage capacity (the consumption of memory capacity).

The management interface module 1905 displays a screen (typically a GUI (Graphical User Interface)) for the system administrator to carry out operations on a display device that is connected to the primary server apparatus 100 or the client device 112.

FIGS. 20 and 21 are examples of the merged difference bitmap management table 2000. FIG. 20 shows the merged difference bitmap management table 2000 prior to the difference bitmap merge module 1904 being executed, and FIG. 21 shows the merged difference bitmap management table 2000 subsequent to the difference bitmap merge module 1904 being executed.

The merged difference bitmap management table 2000 is configured practically the same as the difference bitmap management table 700, but differs in that the respective snapshot columns hold two sequence numbers. The right sequence number shows the sequence number of the pertinent snapshot itself, and the left sequence number shows the sequence number of the oldest generation snapshot of the snapshots that have been merged.

Hereinbelow, the processing flow executed when the system administrator selects a snapshot to be the target of a remote copy will be explained using FIGS. 20 to 23.

First, when the management interface module 1905 is executed, a screen for selecting the target snapshot is displayed. FIG. 22 is an example of this screen. The copy-targeted snapshot selection screen 2200 of FIG. 22 comprises a checkbox 2201 for selecting a snapshot; uncopied snapshot 2202, which is a list of the names of snapshots that have not been copied to the secondary site; a column 2203 of the dates/times that these snapshots were created; a select button 2204 for deciding on a selection; and a cancel button 2205 for canceling a selection. Furthermore, of the information displayed in FIG. 22, for example, the uncopied snapshot 2202 list of the names of snapshots that have not been copied to the secondary site and the column 2203 of the dates/times that these snapshots were created are managed by the COW management table 400. That is, although not shown in the figure, information showing whether or not a snapshot has been remote copied, the name of the snapshot, and the date/time that the snapshot was created are stored in the COW management table 400. Furthermore, this information can also be managed by a different table using the snapshot sequence number as an ID.

When the system administrator checks an arbitrary snapshot and presses the select button 2204, the management interface module 1905 specifies the sequence number of the selected snapshot (target snapshot) to the difference bitmap merge module 1904, and executes this module 1904. For example, it is supposed that snapshots having the sequence numbers "26" and "28" have been selected. The selected sequence numbers "26" and "28" are specified to the difference bitmap merge module 1904. The specified sequence numbers "26" and "28" are held in a sequence number list (not shown in the figure).

Figure 23:
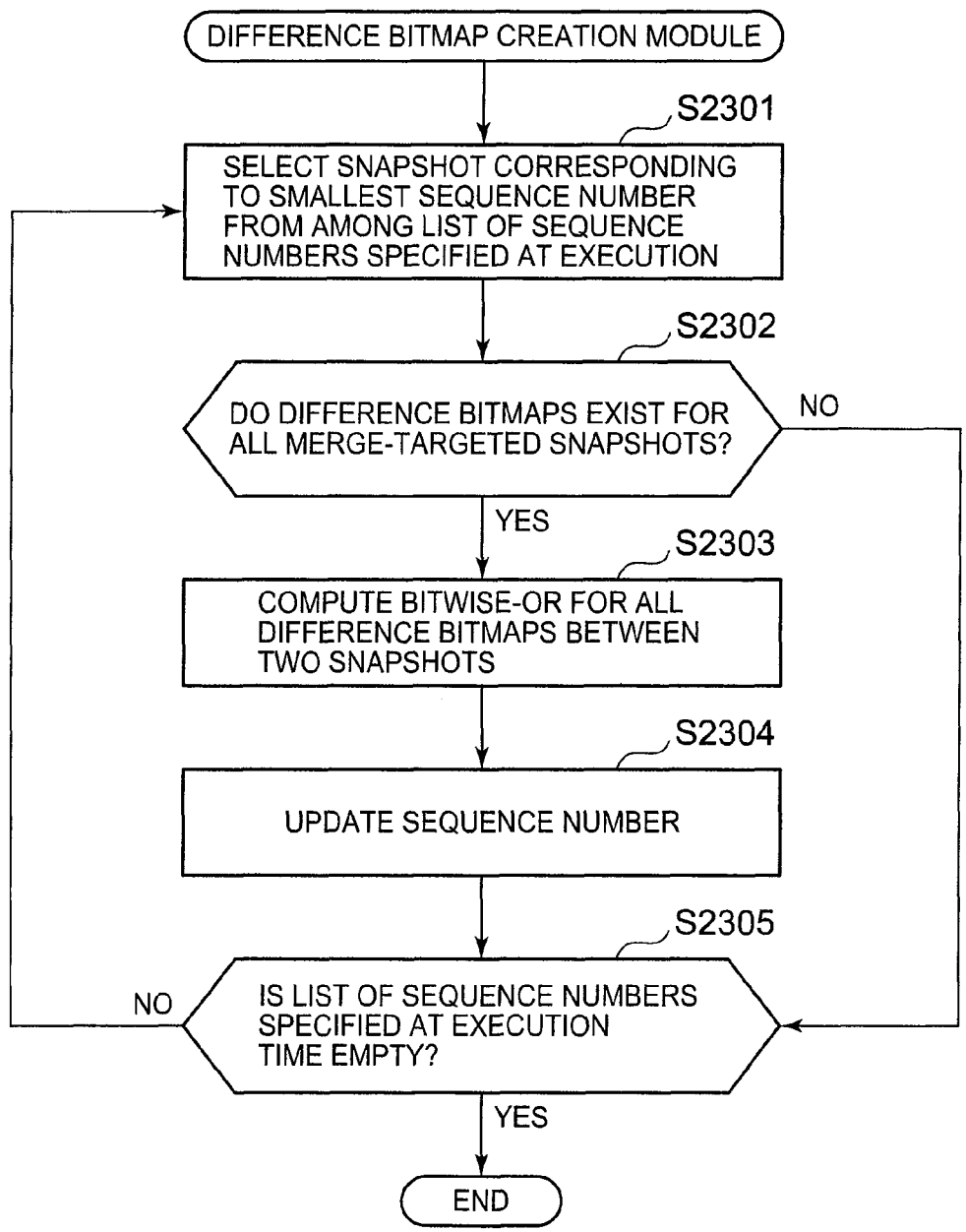
FIG. 23 is a flowchart showing an example of the operation of a difference bitmap creation module of the third embodiment.

FIG. 23 is an example of the processing flow that shows the operation of the difference bitmap merge module 1904.

First, the difference bitmap merge module 1904 selects the snapshot with the lowest sequence number of the one or more sequence numbers stored in the sequence number list (S2301). A difference bitmap of this selected snapshot becomes the merge-destination difference bitmap. The difference bitmap corresponding to the snapshot of sequence number "26" is equivalent to the difference bitmap in the above example.

Next, the difference bitmap merge module 1904 determines if difference bitmaps exist for all the merge-targeted snapshots (S2302). It is determined here if all the difference bitmaps to be merged into the difference bitmap of the snapshot selected in S2301 exist. Firstly, the presence or absence of difference bitmaps corresponding to the respective snapshots from the oldest generation snapshot to the snapshot selected in S2301 of the snapshots that have not been copied to the remote site is determined when S2302 is executed. In the above example, the sequence number of the oldest generation snapshot of the uncopied snapshots is "25", and the sequence number selected in S2301 is "26". The presence or absence of the difference bitmaps for the respective snapshots between the snapshots corresponding to these two sequence numbers is determined.

When the result of the determination of S2302 is affirmative (S2302: YES), the difference bitmap merge module 1904 calculates the bitwise-OR of the one or more inter-snapshot difference bitmaps (S2303), and updates the sequence number (S2304). In the above example, the contents of column 2003 of FIG. 20 are changed to the contents of column 2003' of FIG. 21. The difference bitmaps from the difference bitmap of the sequence number "25" snapshot to the difference bitmap of the sequence number "26" snapshot are merged into the difference bitmap of the sequence number "26" snapshot. The result of this (that is, the difference bitmap of the sequence number "26" snapshot subsequent to the merge) is held in column 2003'.

Then, when S2304 has ended, or, when the result of the determination of S2302 is negative (S2302: NO), the difference bitmap merge module 1904 determines whether or not the sequence number list is empty (S2305).

When the sequence number list is empty (S2305: YES), the difference bitmap merge module 1904 ends as-is. When the sequence number list is not empty (S2305: NO), the difference bitmap merge module 1904 once again selects the snapshot corresponding to the smallest sequence number from among the one or more sequence numbers stored in the sequence number list (S2301).

In the above example, since "26" and "28" are specified as the sequence numbers at the time of execution, subsequent to the end of processing for sequence number "26", processing for sequence number "28" is also carried out. When S2302 is executed more than two times, a determination is made as to the presence or absence of a difference bitmap for the respective snapshots from the snapshot of the generation immediately subsequent to the snapshot of the generation corresponding to the difference bitmap that was the previous merge destination to the snapshot of the sequence number targeted for processing. According to the above example, a determination is made as to whether or not there is a difference bitmap for the respective snapshots from the sequence number "27" snapshot to the sequence number "28" snapshot, and if the result of the determination is that such bitmaps exist, the difference bitmap of the sequence number "27" snapshot is merged with the difference bitmap of the sequence number "28" snapshot.

The preceding has been an explanation of the processing flow that is executed when the system administrator selects a snapshot to be the target of a remote copy.

Next, the different processing of the snapshot creation module 1901, the snapshot deletion module 1902 and the difference bitmap creation module 1903 of this embodiment compared to the first embodiment will be explained.

The snapshot creation module 1901 configures the latest snapshot sequence number 306 in the merged difference bitmap management table 2000 instead of the difference bitmap management table 700 as in S902 of FIG. 9. Furthermore, since the difference bitmap is not merged at this time, both the left and right sequence numbers constitute the latest snapshot sequence number 306.

The snapshot deletion module 1903 configures "–(null)" in the merged difference bitmap management table 2000 instead of the difference bitmap management table 700 as in S1003 of FIG. 10.

The difference bitmap creation module 1904 determines if the difference bitmaps in S1301 of FIG. 13 exist. Since the merged difference bitmap is managed in the merged difference bitmap management table 2000, the difference bitmap creation module 1904 makes the determination referencing the two sequence numbers held by the respective snapshots. For example, if it is supposed that the sequence number of the snapshot copied to the remote site is "24", and the sequence number of the copy-targeted snapshot is "26", the sequence numbers "24" and "26" are specified to the difference bitmap creation module 1904 at execution time. The difference bitmap between sequence numbers "24" and "25" (column 2002 of FIG. 20) is "–(null)" in column 2002' of FIG. 21, but since this inter-snapshot difference bitmap is merged with the difference bitmap of the sequence number "26" snapshot, it is possible to create a transfer difference bitmap 205 without referencing the COW management table 400. Specifically, a duplicate of the difference bitmap of the sequence number "26" snapshot can be used as the transfer difference bitmap 205. However, when the specified sequence numbers at execution time are "25" and "27", the difference bitmap between sequence numbers "26" and "27" (column 2004 of FIG. 20) is merged with the difference bitmap of the sequence number "28" snapshot (that is, it does not exist), thus making it necessary to reference the COW management table 400 to create a difference bitmap between the sequence numbers "26" and "27".

Embodiment 4

Next, a fourth embodiment of the present invention will be explained. The points of difference with the first embodiment will mainly be explained hereinbelow, and explanations of the points in common with the first embodiment will either be omitted or simplified.

In this embodiment, a remote copy program, snapshot management program, and block I/O program are executed by the CPU of the storage apparatus (for example, the storage apparatus comprises functions as a NAS.).

Figure 24:
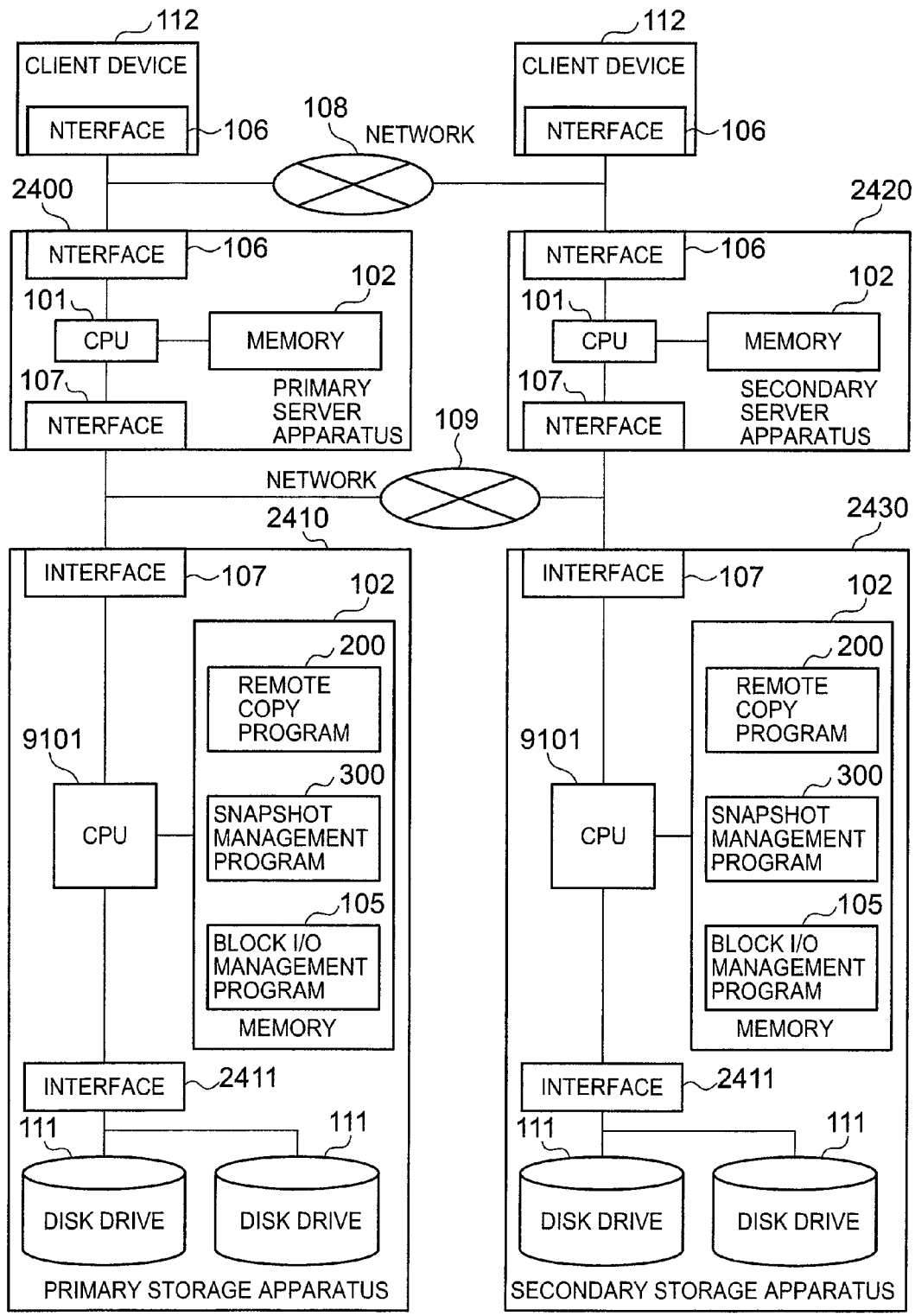
FIG. 24 is a diagram showing an example of the configuration of a storage system of a fourth embodiment.

FIG. 24 is a diagram showing an example of the configuration of a storage system of a fourth embodiment of the present invention.

The storage system of this embodiment comprises a primary server apparatus 2400; a primary storage apparatus 2410; the client device 112; a secondary server apparatus 2420; and a secondary storage apparatus 2430. The primary storage apparatus 2410 and secondary storage apparatus 2430 are connected to the primary server apparatus 2400 and the secondary server apparatus 2420 via a single network 109. Further, in the primary storage apparatus 2410 and in the secondary storage apparatus 2430, a remote copy program 200, snapshot management program 300 and block I/O program 105 are stored in the memory 102, and these programs 200, 300 and 105 are executed by the CPU 101. Further, in the primary storage apparatus 2410 and in the secondary storage apparatus 2430, an interface 2411 is set up between the CPU 101 and the disk drive 111.

In the configuration of this embodiment, the CPU 101 of the storage apparatuses 2410 and 2430 execute the remote copy program 200 and the snapshot management program 300, and remote copy a primary site snapshot to the secondary site by way of the network 109. Since a high-speed network 109 other than network 108 can be used in the remote copy between the storage apparatuses 2410 and 2430, high-speed data transfer is possible. Here, for example, network 108 is an IP (Internet Protocol) network, and network 109, for example, is a FC (Fibre Channel) network.

A number of embodiments of the present invention have been explained hereinabove, but these are examples for explaining the present invention, and do not purport to limit the scope of the present invention solely to these embodiments. The present invention can be put into practice in various other modes as well.

What is claimed is:

1. A system, comprising:
   a first server including a first CPU (central processing unit) and a first memory;
   a first storage system including a plurality of first storage devices, the plurality of storage devices providing a plurality of first logical volumes to the first server, each first logical volume including an operational volume where the first server can perform read and write operations, and a differential volume;
   a second server; and
   a second storage system including a plurality of second storage devices, the plurality of second storage devices providing a plurality of second logical volumes to the second server,
   wherein the first memory stores a remote copy program and a volume management program, the remote copy program and the volume management program being executed by the first CPU,
   wherein the volume management program:
   takes snapshots of the operational volume from a first point in time to an $n^{th}$ point in time (n is an integer, where n≥3),
   for each address of the operational volume, if a first-time write operation occurs after taking the snapshot at an $i^{th}$ point in time before taking the snapshot at an $(i+1)^{th}$ point in time (i is an integer, where 1≤i≤n), copies data stored at the address of the operational volume to the differential volume before the write operation,
   for each address of the operational volume, manages a first bitmap and a second bitmap, the first bitmap indicating whether the write operation occurred after taking the snapshot at a $(j-1)^{th}$ point in time before taking the snapshot at a $j^{th}$ point in time (j is an integer, where 2≤j≤n), and the second bitmap indicating addresses in the differential volume where the data is copied,
   wherein when remote copying of the snapshots from a $k^{th}$ point in time to the $n^{th}$ point in time (k is an integer, where 2≤k≤n−1) occurs, for each address of the operational volume, the volume management program provides a third bitmap indicating whether the write operation occurred after taking the snapshot at a $(k-1)^{th}$ point in time before taking the snapshot at the $(n+1)^{th}$ point in time based on the first bitmap, and the remote copy program specifies data necessary to remote copy by checking whether a bit is on or off in the third bitmap for each address of the operational volume.

2. The system according to claim 1, wherein the volume management program provides the third bitmap by, for each address of the operational volume, performing an OR operation of bits in the first bitmap for indicating whether the write operation occurred after taking the snapshot at an $(l-1)^{th}$ point in time before taking the snapshot at an $l^{th}$ point in time (l is an integer, where k≤j≤n+1).

3. The system according to claim 1, wherein in response to a request from the remote copy program, the volume management program creates the third bitmap.

4. The system according to claim 1, wherein the volume management program manages the first bitmap, the second bitmap, and the third bitmap for a plurality of addresses of the operational volume.

5. A system, comprising:
   a first server including a first CPU (central processing unit) and a first memory;
   a first storage system including a plurality of first storage devices, the plurality of first storage devices providing a plurality of first logical volumes to the first server, each first logical volume including an operational volume where the first server can perform read and write operations, and a differential volume;
   a second server; and
   a second storage system including a plurality of second storage devices, the plurality of second storage devices providing a plurality of second logical volumes to the second server,
   wherein the first memory stores a remote copy program and a volume management program, the remote copy program and the volume management program being executed by the first CPU,
   wherein the volume management program:
   takes snapshots of the operational volume from a first point in time to an $n^{th}$ point in time (n is an integer, where n≥3), the snapshot at the $n^{th}$ point in time being the latest snapshot,
   for each address of the operational volume, if a first-time write operation occurs after taking the snapshot at an $i^{th}$ point in time before taking the snapshot at an $(i+1)^{th}$ point in time (i is an integer where 1≤i≤n), copies data stored at the address of the operational volume to the differential volume before the write operation,
   for each address of the operational volume, manages a first bitmap indicating whether the write operation occurred after taking the snapshot at the $n^{th}$ point in time,
   wherein when the remote copy program has remote copied the snapshots from the first point in time to a $k^{th}$ point in time (k is an integer, where 1≤k≤n−1), the volume management program, for each address of the operational volume, manages a second bitmap indicating whether the write operation occurred after taking the snapshot at the $k^{th}$ point in time before taking the snapshot at an $(n+1)^{th}$ point in time, and
   wherein when taking a snapshot at the $(n+1)^{th}$ point in time occurs, the volume management program updates the second bitmap based on the first bitmap, and clears the first bit map.

6. A method of acquiring and copying snapshots in a system, wherein the system comprises:
   a first server including a first CPU (central processing unit) and a first memory;
   a first storage system including a plurality of first storage devices, the plurality of storage devices providing a plurality of first logical volumes to the first server, each first logical volume including an operational volume where the first server can perform read and write operations, and a differential volume;
   a second server; and a second storage system including a plurality of second storage devices, the plurality of second storage devices providing a plurality of second logical volumes to the second server, wherein the first memory stores a remote copy program and a volume management program, the remote copy program and the volume management program being executed by the first CPU, wherein the volume management program causes the first CPU to perform steps of the method, the method comprising:

taking snapshots of the operational volume from a first point in time to an $n^{th}$ point in time (n is an integer, where n≥3);

for each address of the operational volume, if a first-time write operation occurs after taking the snapshot at an $i^{th}$ point in time before taking the snapshot at an $(i+1)^{th}$ point in time (i is an integer, where 1≤i≤n), copying data stored at the address of the operational volume to the differential volume before the write operation;

for each address of the operational volume, managing a first bitmap and a second bitmap, the first bitmap indicating whether the write operation occurred after taking the snapshot at a $(j-1)^{th}$ point in time before taking the snapshot at a $j^{th}$ point in time (j is an integer, where 2≤j≤n), and the second bitmap indicating addresses in the differential volume where the data is copied, wherein when remote copying, by the remote copy program, of the snapshots from a $k^{th}$ point in time to the $n^{th}$ point in time (k is an integer, where 2≤k≤n−1) occurs, the volume management program further causes the first CPU to perform steps of the method, the method further comprising:

for each address of the operational volume, providing a third bitmap indicating whether the write operation occurred after taking the snapshot at a $(k-1)^{th}$ point in time before taking the snapshot at an $(n+1)^{th}$ point in time based on the first bitmap, and specifying data necessary to remote copy by checking whether a bit is on or off in the third bitmap for each address of the operational volume.

7. The method according to claim 6, further comprising:
providing the third bitmap by, for each address of the operational volume, performing an OR operation of bits in the first bitmap for indicating whether the write operation occurred after taking the snapshot at an $(l-1)^{th}$ point in time before taking the snapshot at an $l^{th}$ point in time (l is an integer, where k≤j≤n+1).

8. The method according to claim 6, further comprising:
creating the third bitmap in response to a request from the remote copy program.

9. The method according to claim 6, further comprising:
managing the first bitmap, the second bitmap, and the third bitmap for a plurality of addresses of the operational volume.

10. A method of acquiring and copying snapshots in a system, wherein the system comprises:

a first server including a first CPU (central processing unit) and a first memory;

a first storage system including a plurality of first storage devices, the plurality of first storage devices providing a plurality of first logical volumes to the first server, each first logical volume including an operational volume where the first server can perform read and write operations, and a differential volume;

a second server; and a second storage system including a plurality of second storage devices, the plurality of second storage devices providing a plurality of second logical volumes to the second server, wherein the first memory stores a volume management program, the volume management program being executed by the first CPU, and causing the first CPU to perform steps of the method, the method comprising:

taking snapshots of the operational volume from a first point in time to an $n^{th}$ point in time (n is an integer, where n≥3), the snapshot at the $n^{th}$ point in time being the latest snapshot;

for each address of the operational volume, if a first-time write operation occurs after taking the snapshot at an $i^{th}$ point in time before taking the snapshot at an $(i+1)^{th}$ point in time (i is an integer where 1≤i≤n), copying data stored at the address of the operational volume to the differential volume before the write operation;

for each address of the operational volume, managing a first bitmap indicating whether the write operation occurred after taking the snapshot at the $n^{th}$ point in time, wherein when remote copying, by the remote copy program, of the snapshots from the first point in time to a $k^{th}$ point in time (k is an integer, where 1≤k≤n−1) occurs, the volume management program further causes the first CPU to perform steps of the method, the method further comprising:

managing, for each address of the operational volume, a second bitmap indicating whether the write operation occurred after taking the snapshot at the $k^{th}$ point in time before taking the snapshot at an $(n+1)^{th}$ point in time; and updating the second bitmap based on the first bitmap, and clearing the first bit map, when taking a snapshot at the $(n+1)^{th}$ point in time occurs.

* * * * *